US012759399B2

(12) United States Patent
Kang et al.

(10) Patent No.: US 12,759,399 B2
(45) Date of Patent: Oct. 13, 2026

(54) BENDABLE DISPLAY DEVICE

(71) Applicant: LG ELECTRONICS INC., Seoul (KR)

(72) Inventors: Seongbin Kang, Seoul (KR); Seongcheol Lim, Seoul (KR); Sungsoo Chang, Seoul (KR); Soohwan Yim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 19/091,405

(22) Filed: Mar. 26, 2025

(65) Prior Publication Data

US 2026/0116191 A1 Apr. 30, 2026

(30) Foreign Application Priority Data

Oct. 28, 2024 (WO) ................ PCT/KR2024/016531

(51) Int. Cl.
*G09G 5/00* (2006.01)
*B60K 35/22* (2024.01)
*B60K 35/53* (2024.01)
*G06F 1/16* (2006.01)

(52) U.S. Cl.
CPC ............ *B60K 35/53* (2024.01); *B60K 35/223* (2024.01); *G06F 1/1601* (2013.01); *B60K 2360/126* (2024.01)

(58) Field of Classification Search
CPC B60K 35/53; B60K 35/223; B60K 2360/126; G06F 1/1601
USPC .......................................................... 345/156
See application file for complete search history.

(56) References Cited

U.S. PATENT DOCUMENTS

| | | | | |
|---|---|---|---|---|
| 2023/0269889 A1* | 8/2023 | Beschnitt | ............... | B60K 35/53 361/807 |
| 2024/0015907 A1* | 1/2024 | Kang | ..................... | B60K 35/10 |
| 2024/0397647 A1* | 11/2024 | Kim | ....................... | B60K 35/22 |

FOREIGN PATENT DOCUMENTS

| | | | |
|---|---|---|---|
| JP | 2004-149057 A | 5/2004 |
| KR | 10-0782888 B1 | 12/2007 |
| KR | 10-2392268 B1 | 5/2022 |
| KR | 10-2022-0135105 A | 10/2022 |
| KR | 10-2024-0007113 A | 1/2024 |

* cited by examiner

*Primary Examiner* — Jennifer T Nguyen

(74) *Attorney, Agent, or Firm* — Birch, Stewart, Kolasch & Birch, LLP

(57) ABSTRACT

A bendable display device is disclosed. The bendable display device includes: a display module including a first flat portion, a second flat portion, and a bendable portion disposed between the first flat portion and the second flat portion; a bending module configured to bend and deform the bendable portion so that the first flat portion transitions from a first state in which the first flat portion faces a first direction to a second state in which the first flat portion faces a second direction; and a slide module configured to slide the second flat portion in the first direction so that the first flat portion transitions from the second state to a third state in which the first flat portion further moves in the second direction. The bending module includes a rear plate provided with a rear slot into which a rear pin formed on a rear surface of the first flat surface is inserted. When transitioning from the second state to the third state, the rear pin slides on the rear slot.

20 Claims, 26 Drawing Sheets

(a)

(b)

BENDABLE DISPLAY DEVICE

This application claims the benefit of International Patent Application No. PCT/KR2024/016531, filed on Oct. 28, 2024, which is hereby incorporated by reference as if fully set forth herein.

BACKGROUND OF THE DISCLOSURE

Field of the Disclosure

The present disclosure relates to a deformable display device, and more particularly to a display device which can be changed in position when necessary and is formed to be retractable or withdrawable when necessary.

Discussion of the Related Art

A vehicle refers to a device that drives in the direction desired by a user who rides in the vehicle. Recently, vehicles have been designed to include not only an engine and wheels for simple driving, but also various devices for the safety and convenience of vehicle users.

First, the convenience functions of vehicles have a development motive related to driver convenience such as providing an infotainment (information+entertainment) function to vehicles, supporting a partial autonomous driving function, assisting to secure a field of view (FOV) of a driver at night or in a blind spot. For example, there are functions such as active cruise control (ACC), a smart parking assist system (SPAS), a night vision (NV), a head-up display (HUD), an around view monitor (AVM), an adaptive headlight system (AHS), and the like.

The safety function, which is technology to secure drivers' safety or pedestrians' safety, includes a lane departure warning system (LDWS), a lane keeping assist system (LKAS), an autonomous emergency braking (AEB) function, and the like.

A dashboard (cluster) used to provide information on a state of the vehicle has been digitized and replaced with a display device. In addition, whereas a conventional center fascia located between a driver's seat and a passenger's seat previously only had an output function, an evolved center fascia further includes a touch function so that the evolved center fascia can function as an input device as well.

A display not only outputs information, but also has a touch sensor that allows for touch input at the same time as such information displayed, so that the display can function as both an output device and an input device at the same time, and thus a display device applicable to vehicles is gradually increasing in size.

For convenience of users of vehicles, it is desirable for a vehicle display panel to be larger in size. However, the display panel may occupy a lot of space in the vehicle when not in use. In this way, if the display panel occupies too much space in the vehicle when turned off, the display panel may be a factor that harms the efficiency of the vehicle's interior design.

There is a need for a display device that can be pulled out only when necessary to provide a screen of a sufficiently large size without compromising the vehicle's interior design efficiency.

SUMMARY OF THE DISCLOSURE

Accordingly, embodiments of the present disclosure are directed to a bendable display device that substantially obviates one or more problems due to limitations and disadvantages of the related art.

An object of the present disclosure is to provide a retractable or withdrawable display device that is designed to be withdrawable when necessary or retractable when unnecessary to reduce the size of an exposed display screen.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a bendable display device may include: a display module including a first flat portion, a second flat portion, and a bendable portion disposed between the first flat portion and the second flat portion; a bending module configured to bend and deform the bendable portion so that the first flat portion transitions from a first state in which the first flat portion faces a first direction to a second state in which the first flat portion faces a second direction; and a slide module configured to slide the second flat portion in the first direction so that the first flat portion transitions from the second state to a third state in which the first flat portion further moves in the second direction. The bending module includes a rear plate provided with a rear slot into which a rear pin formed on a rear surface of the first flat surface is inserted; and when transitioning from the second state to the third state, the rear pin slides on the rear slot.

The rear plate may include: a flat support portion oi which the rear slot is formed; and a curved support portion extending in a third direction opposite to the first direction from the flat support portion and curved in a direction away from the display module, wherein the curved support portion supports a rear surface of the bendable portion in the second state and the third state The bendable display device may further include: a first display rail formed on the slide frame; a second display rail formed on the rear plate and consecutively arranged in the first direction with respect to the first display rail; and a first display pin configured to protrude from a rear surface of the bendable portion, wherein the first display pin moves from the first display rail to the second display rail when transitioning from the first state to the second state.

The rear plate may include: a flat support portion in which the rear slot is formed; and a curved support portion extending from the flat support portion in a third direction opposite to the first direction and curved in a direction away from the display module, wherein the second display rail is configured such that a front surface of a portion formed on the curved support portion is open.

The bendable display device may further include: a third display rail formed in the slide module; and a second display pin protruding from a rear surface of the second flat portion and inserted into the third display rail to slide.

The slide module may include: a first slide frame in which the third display rail is formed; and a second side frame in which the second display rail is formed, wherein a gap through which the second display pin passes is formed between the first slide frame and the second slide frame.

The slide module may be driven such that the second flat portion slides in the first direction during operation of the bending module.

The bendable display may further include: a panel rack gear extending in the first direction and formed on a front surface of the rear plate; and a panel gear located on a rear surface of the display module and engaged with the panel rack gear, wherein, when transitioning from the second state to the third state, the panel gear moves in a longitudinal direction of the panel rack gear on the panel rack gear.

The bendable display device may further include: a base module including a guide wall that has a slide rail formed on a side surface thereof; and a first slide pin formed in the slide module and inserted into the slide rail to move.

The bending module may include: a second slide pin inserted into the slide rail and moved in the first direction.

The bending module may include: a rotary arm extending from the rear plate in a direction away from a rear surface of the display module; a bending link having one end coupled to the rotary arm through a rotary shaft; and a first driver configured to provide power in a first direction to the bending link, whereby, when the first driver provides power in the first direction, the rotary arm rotates and the display module transitions to the second state.

The slide module may include a slide frame coupled to the rotary shaft and including an arch-shaped shaft slot formed therein. A center of curvature of the bendable portion in the second state may correspond to a center of curvature of the shaft slot.

The center of curvature of the shaft slot may be located lower than a lower end of the slide frame.

The rotary shaft may be located at one end of the shaft slot in the first state, and may be located at the other end of the shaft slot in the second state; and the rotational arm may rotate at an angle corresponding to an extension angle of the shaft slot when transitioning from the first state to the second state.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
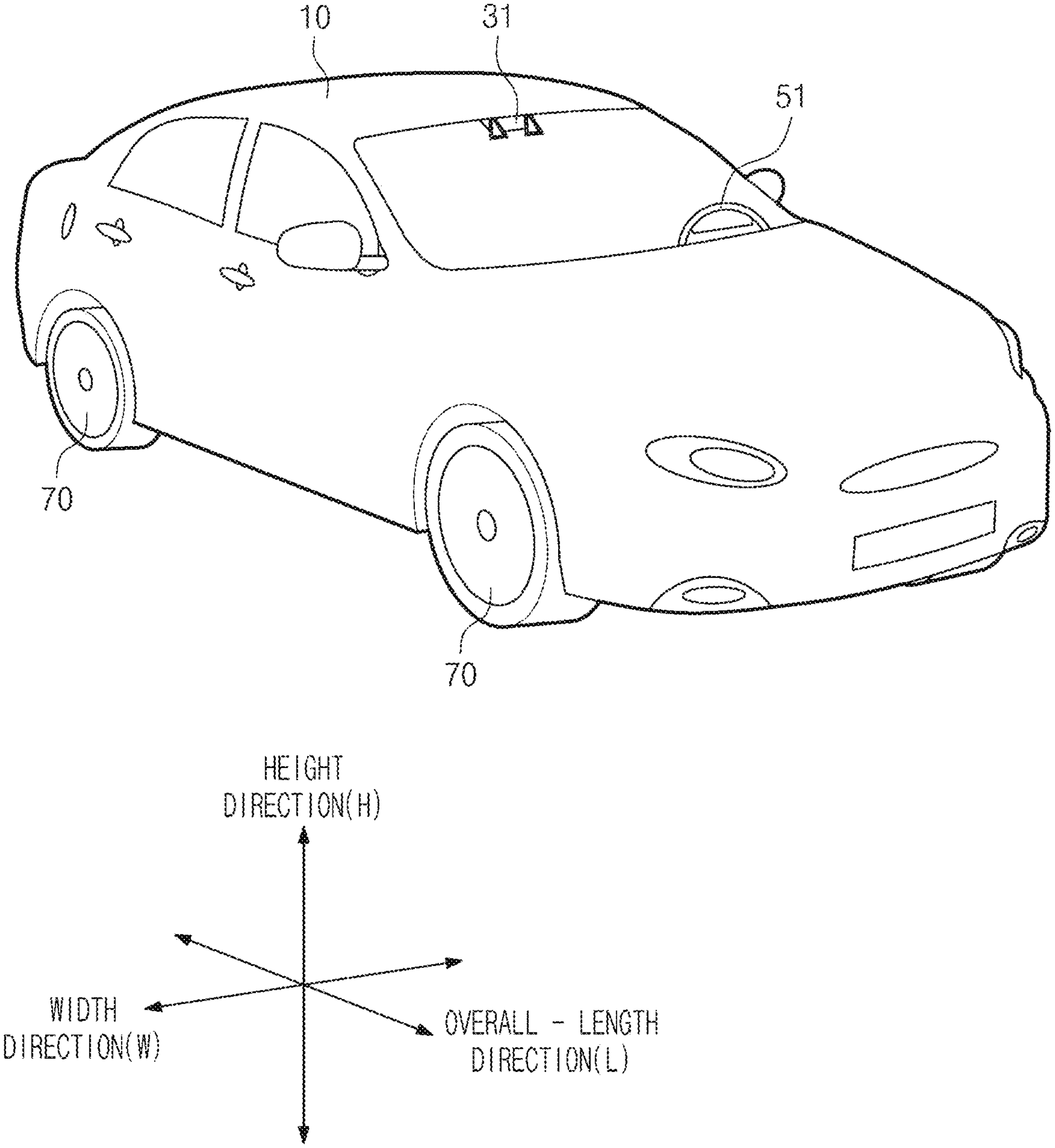
FIG. 1 is a view illustrating the exterior of a vehicle according to embodiments of the present disclosure.
Figure 2:
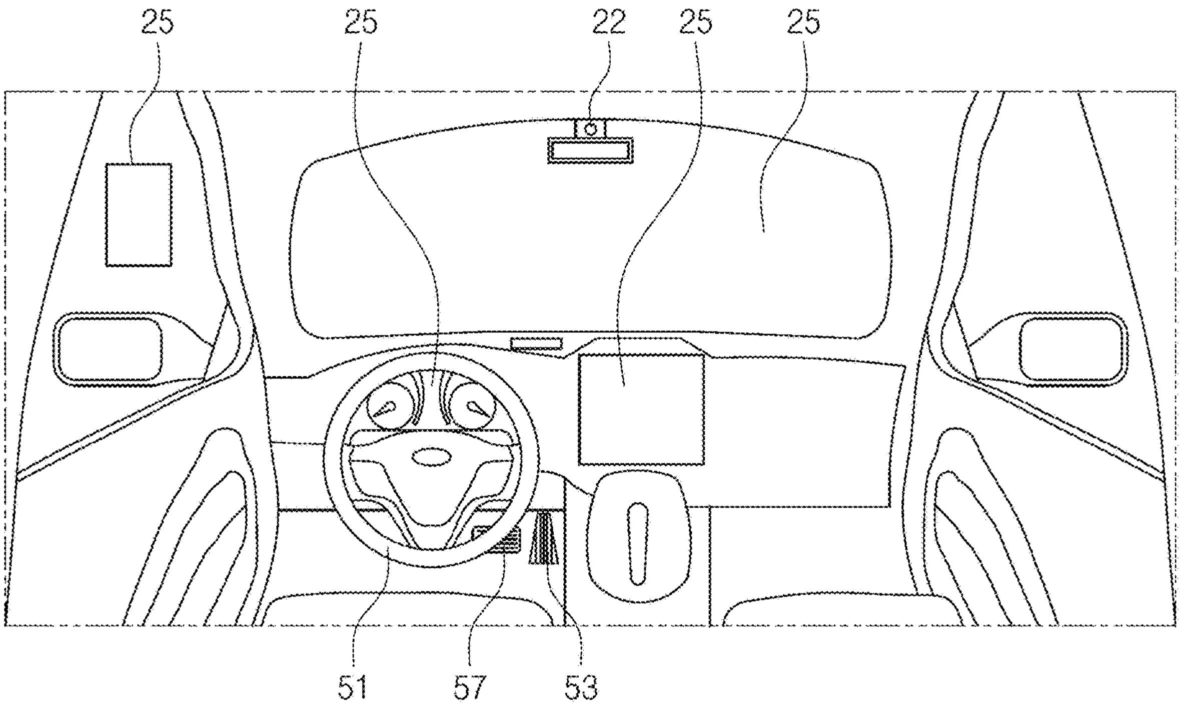
FIG. 2 is a view illustrating the interior of a vehicle according to embodiments of the present disclosure.

FIG. 1 is a view illustrating the exterior of a vehicle according to embodiments of the present disclosure. FIG. 2 is a view illustrating the interior of a vehicle according to embodiments of the present disclosure.

The vehicle may include wheels 70 that rotate by a power source, and may be configured with a windshield that enables a user located in the vehicle to check the front area. The interior of the vehicle may include a steering input device 51 configured to control the traveling direction of the vehicle, and an acceleration input device 53 and a brake input device 57 which are configured to control the speed of the vehicle.

The steering input device 51 may receive a user's input signal as to the traveling direction of the vehicle 10. It is preferable that the steering input device 51 be formed in the form of a steering wheel so that steering input can be performed by rotation. According to an embodiment, the steering input device may also be formed in a shape of a touchscreen, a touchpad, or a button.

The acceleration input device 50 may receive a user's input signal for accelerating the vehicle 10. The brake input device 57 may receive a user's input signal for decelerating the vehicle 10. It is preferable that the acceleration input device 53 and the brake input device 57 be formed in the shape of a pedal. Depending on the embodiment, the acceleration input device or the brake input device may also be formed in the shape of a touchscreen, a touchpad, or a button.

The vehicle may operate in a manual mode in which the user controls the driving direction of the vehicle by operating the steering device, the acceleration input device, and the brake input device. Alternatively, the vehicle may switch to an autonomous driving mode based on information and data provided from the external device and other information about surrounding objects, so that the driving system can drive autonomously without user's manipulation.

The vehicle may include a communication device configured to receive information and data from an external device. The communication device is a device for communicating with an external device. Here, the external device may be another vehicle, a mobile terminal, or a server.

The communication device may include at least one of a transmission (Tx) antenna, a reception (Rx) antenna, a radio frequency (RF) circuit and RF element(s) capable of implementing various communication protocols.

The communication device may include a short-range communication unit, a location information unit, a V2X communication unit, an optical communication unit, a broadcast transceiver, and a processor.

The vehicle may include an object detection device to obtain information about surrounding objects.

The objects may include lanes, other vehicles, pedestrians, two-wheeled vehicles, traffic signals, lights, roads, structures, speed bumps, terrain features, animals, etc. The object detection devices may include cameras, radars, lidars, ultrasonic sensors, and infrared (IR) sensors.

The driving system serving as a system that controls various operations of the vehicle may operate in an autonomous driving mode. In a manual mode, the driving system may assist the user's manipulation.

The driving system may include a processor, and may control the power source and the wheels 70 based on various kinds of information received from the object detection device and the communication device.

The vehicle may include a user interface (UI) device for communicating with the user. The user interface device may receive a user input, and may provide the user with information generated by the vehicle 10.

The user interface device may include an input unit, an internal camera 220, a biometric detection unit, an output unit 25, and a processor. Depending on the embodiment, the user interface (UI) device may include other components in addition to the above-described components, or may not include some of the above-described components.

The output unit 25 may generate output signals related to a visual sense, an auditory sense, or a tactile sense. The output unit 25 may include at least one of a display device and an audio output unit, and may display graphics corresponding to various kinds of information through the display device. The display device may include a display panel including one of a liquid crystal display (LCD), a thin film transistor liquid crystal display (TFT LCD), an organic light emitting diode (OLED), and a flexible display.

As the display panel becomes thinner and the shape of the display panel is diversified, the output unit may increase in size and the arrangement position of the output unit may be diversified. In addition, the display device is layered with a touch sensor configured to recognize a user's touch, so that the output unit can function as an input unit as well.

Typically, display device(s) may be placed on the steering wheel, a dashboard (instrument panel), seat(s), a pillar, door(s), a center console, a headlining, a sun visor, a windshield, etc. where the input unit is located. Accordingly, the display device applicable to the vehicle is gradually increasing in size.

It is preferable for the size of the display panel 410 to increase for convenience of use. In contrast, the display panel 400 may occupy a large area in the vehicle when not in use and may occupy too much space in the vehicle when turned off, so that the display panel 400 may cause damage to the interior design of the vehicle.

There is a need for a display device that can be pulled out only when necessary so that a sufficiently large screen can be provided to the vehicle without harming the interior design elements of the vehicle.

Accordingly, the present disclosure provides a display device that can be pulled out when necessary and retracted (inserted) when unnecessary to reduce the size of the exposed screen. Although the display device according to the present disclosure has been described as being mounted in a vehicle, other implementations are also possible, and it should be noted that the display device can also be installed not only in a mode of a transport other than a vehicle, but also in a fixed place.

Figure 3:
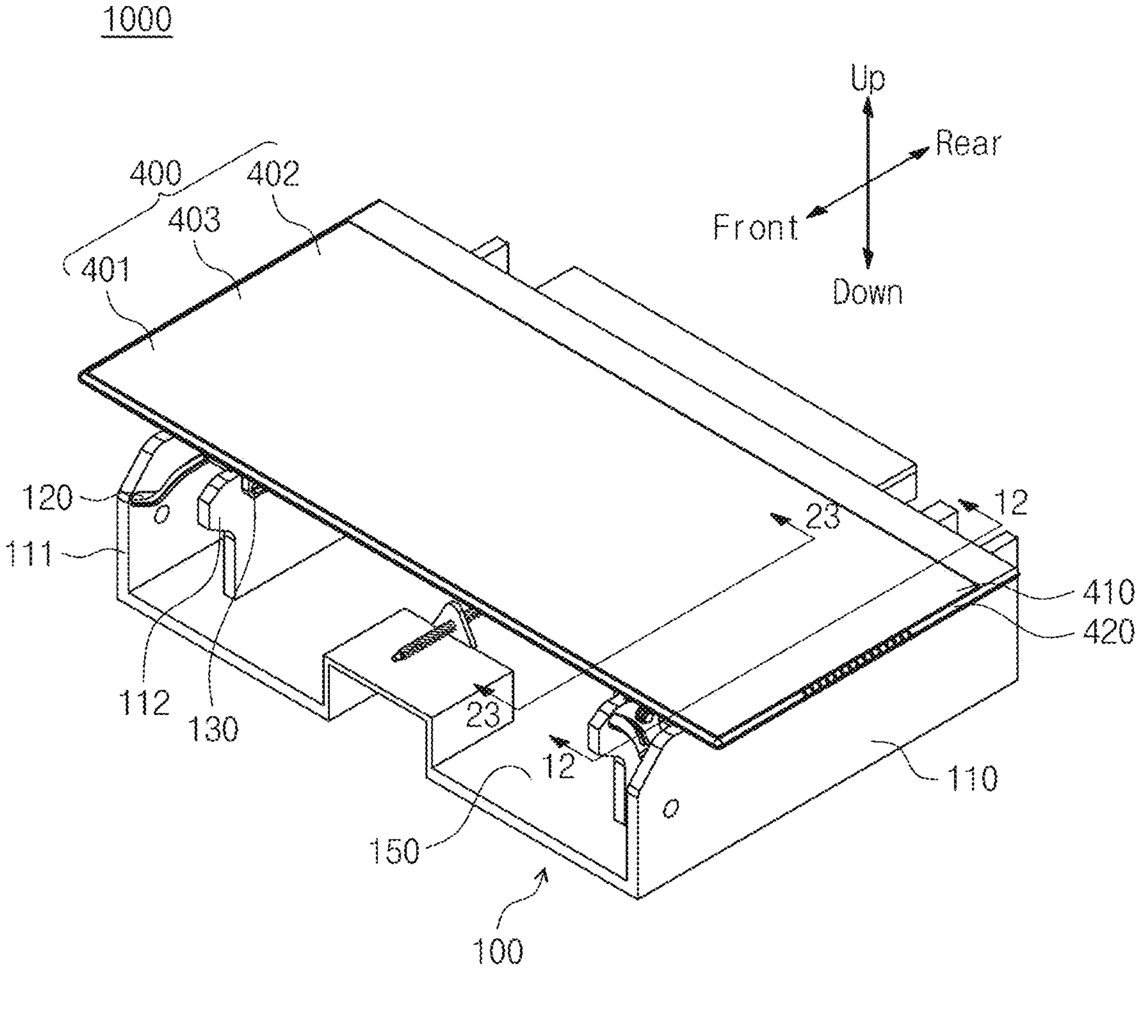
FIG. 3 is a perspective view illustrating a first state of a display device according to an embodiment of the present disclosure.
Figure 4:
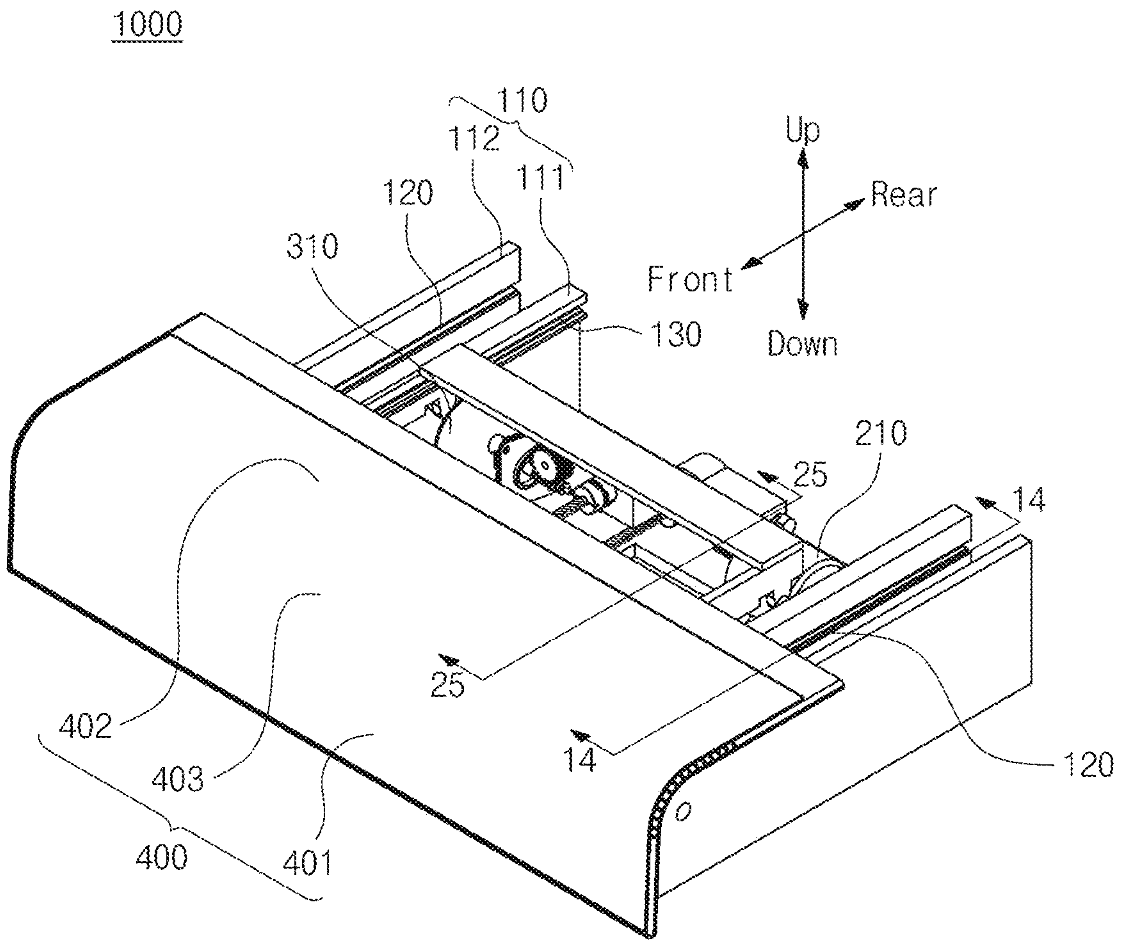
FIG. 4 is a perspective view illustrating a second state of a display device according to an embodiment of the present disclosure.

FIG. 3 is a perspective view illustrating a first state of the display device 1000 according to an embodiment of the present disclosure. FIG. 4 is a perspective view illustrating a second state of the display device 1000 according to an embodiment of the present disclosure.

Figure 5:
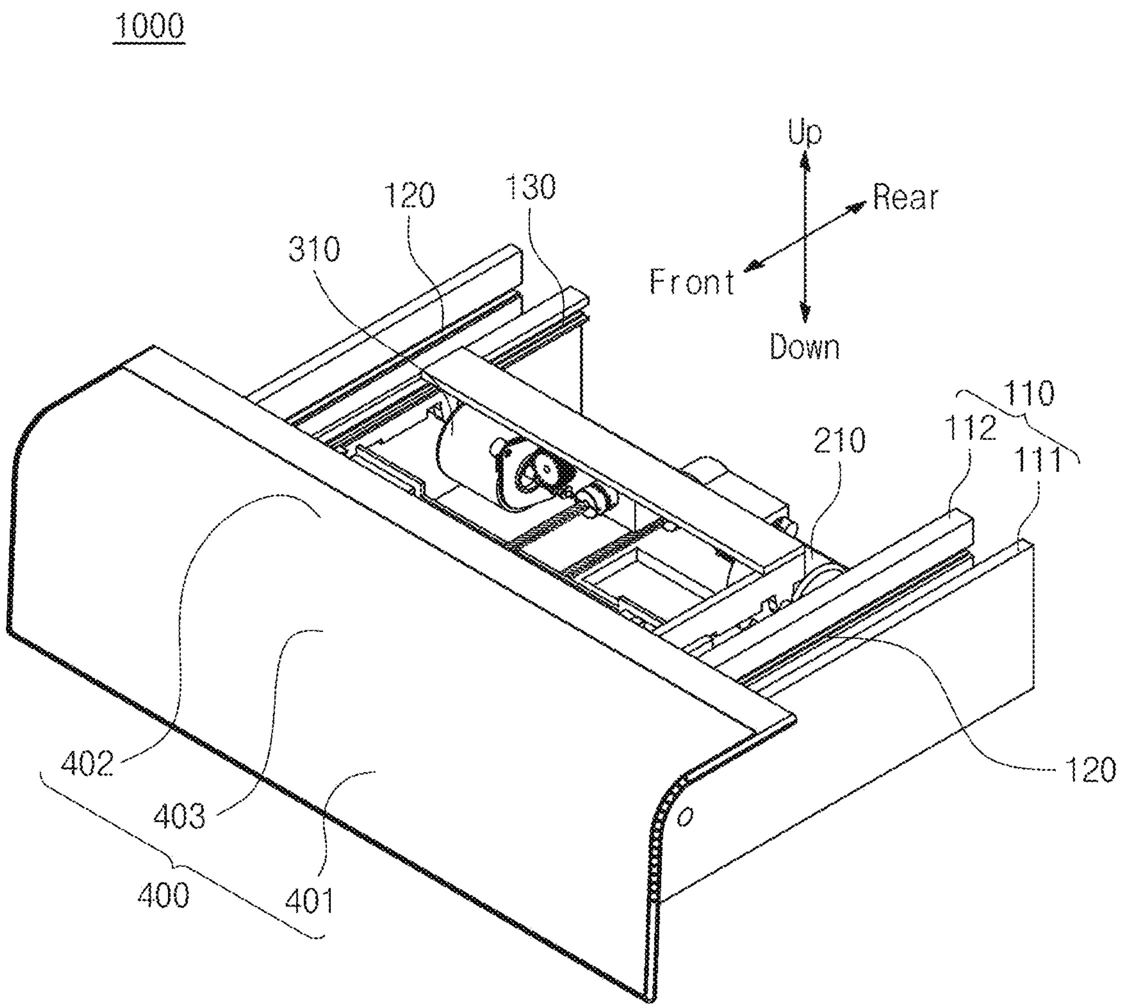
FIG. 5 is a perspective view illustrating a third state of a display device according to an embodiment of the present disclosure.

FIG. 5 is a perspective view illustrating a third state of the display device 1000 according to an embodiment of the present disclosure. FIGS. 3 to 5 are perspective views of the display device when viewed obliquely from above. In FIGS. 3 to 5, the left lower end of each drawing indicates the front direction. For convenience of description, the expression "front direction" will hereinafter be referred to as a "first direction".

The display device 1000 according to the present disclosure may include a base module 100 fixed to a vehicle, etc., and a display module 400 movable on the base module 100. The display module 400 may include a flexible display panel 410, and may be bent and deformed as shown in FIGS. 4 and 5.

The display module 400 may include a first flat portion 401 and a second flat portion 402 that maintain a flat state, and may include a bendable portion 403 disposed between the first flat portion 401 and the second flat portion 402. A flat portion disposed in the first direction will hereinafter be referred to as the first flat portion 401, and a flat portion disposed in the opposite direction to the first direction will hereinafter be referred to as the second flat portion 402.

In order to implement the bendable portion 403, the display module 400 may use a flexible display panel 410 such as an organic light emitting diode (OLED) panel capable of bending deformation, and the first flat portion 401, the second flat portion 402, and the bendable portion 403 may be distinguished from each other by the rear surface structure of the display panel 410.

Each of the first flat portion 401 and the second flat portion 402 may include a flat rear surface support structure for fastening a driver or a guide structure that provides power to drive the display module 400. As illustrated in FIG. 3, the bendable portion 403 supports the rear surface of the display panel 410 with a plurality of bending bars 423 extending in the horizontal direction, and an angle between the bending bars 423 may change, and a curvature of the bendable portion 403 may also change.

The display device 1000 may include a housing 500 (see FIG. 12) in which the display device 1000 is accommodated, and the housing 500 may have a panel opening 510 (see FIG. 12) formed in a first direction of the display device 1000 so that the display module 400 can pass through the panel opening 510. The display device 1000 according to the present disclosure may be inserted (retracted) and withdrawn through the panel opening 510 and may be optionally exposed to a user.

The first state illustrated in FIG. 3 may be a state in which the display module 400 is accommodated in the housing and is not in use. The second state illustrated in FIG. 4 is a state in which only a part of the display module 400 including the first flat portion 401 is exposed through the opening 510.

Unlike the first flat portion 401 and the first state, in the second state, the display module 400 is located to face downward.

Here, the downward direction may be referred to as a second direction to be distinguished from the first direction described above, and the second direction may be at an angle close to 90° with respect to the first direction, but is not necessarily limited thereto, and the second direction is bent to face a different direction from the first direction.

The second state is a state in which the angle between the first flat portion 401 and the second flat portion 402 in the first state becomes smaller, and the bendable portion 403 is bent with a predetermined curvature, and the display module 400 may move in the first direction so that the display module 400 can be pulled out through the panel opening 510.

The third state is a state in which the display module 400 is further withdrawn from the second state, and the area facing the second direction is larger in size. The second state in which only a part of the display module 400 is withdrawn may be referred to as a half screen, and the state in which the display module 400 is withdrawn to the maximum may be referred to as a full screen.

Figure 6:
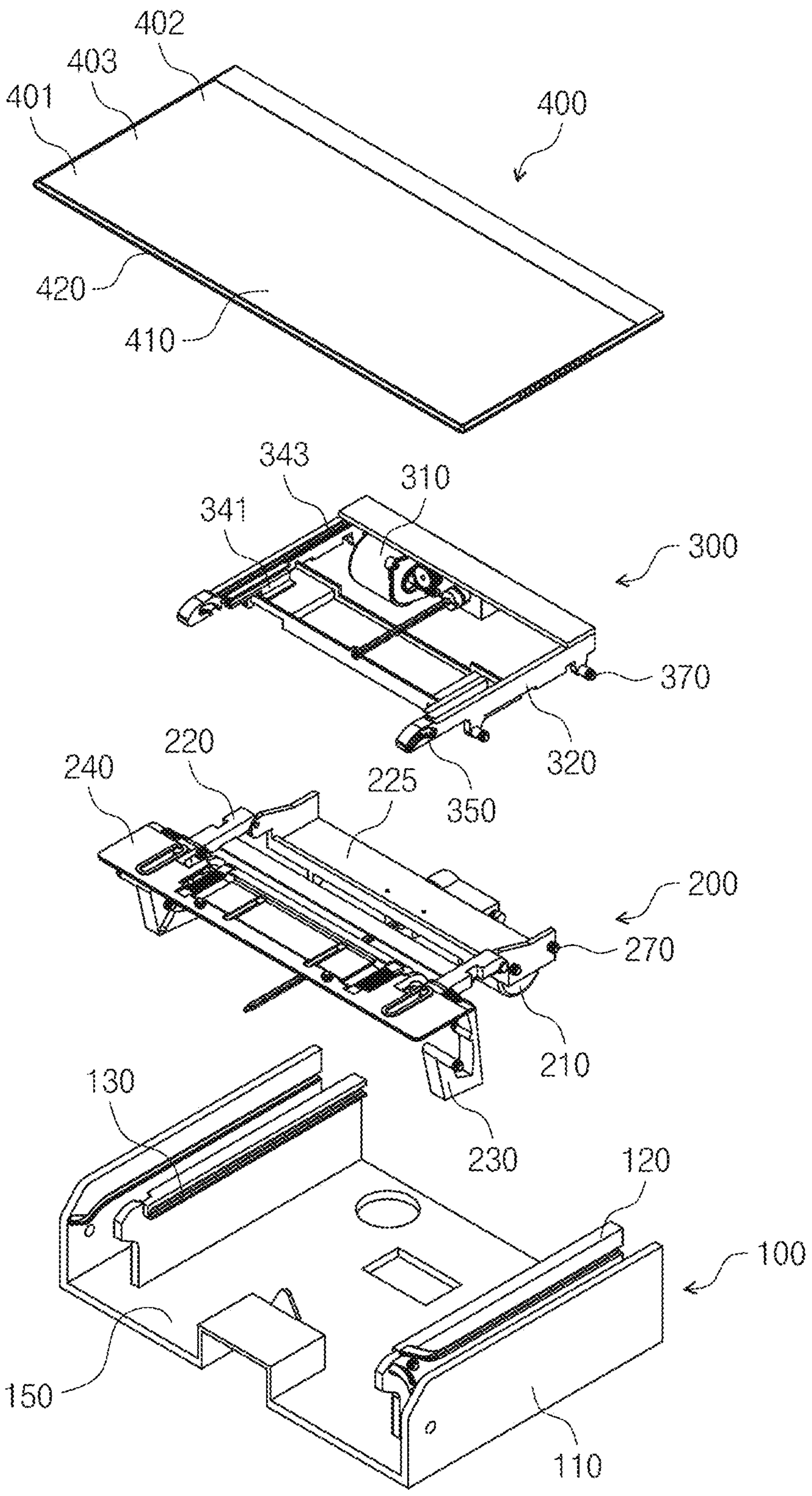
FIG. 6 is an exploded perspective view illustrating a display device according to an embodiment of the present disclosure.

FIG. 6 is an exploded perspective view illustrating the display device 1000 according to one embodiment of the present disclosure. Referring to FIG. 6, the display device 1000 may include a base module 100, a bending module 200, a slide module 300, and a display module 400.

The base module 100 may be fixed to a vehicle, etc., and may include a guide wall 110 formed with rails (120, 130) for guiding the movement of the bending module 200 and the slide module 300 as a driver. Although the guide wall 110 can be provided alone, the scope or spirit of the present disclosure is not limited thereto, and the guide wall 110 may be implemented as one pair of guide walls 110 spaced apart from each other in the side direction so that the display module 400 can move in a horizontally balanced manner.

The base plate 150 interconnecting the guide walls 110 may form the bottom surface of the display device 1000, and the first driver 210 of the bending module 200 may be mounted on the base plate 150.

Figure 7:
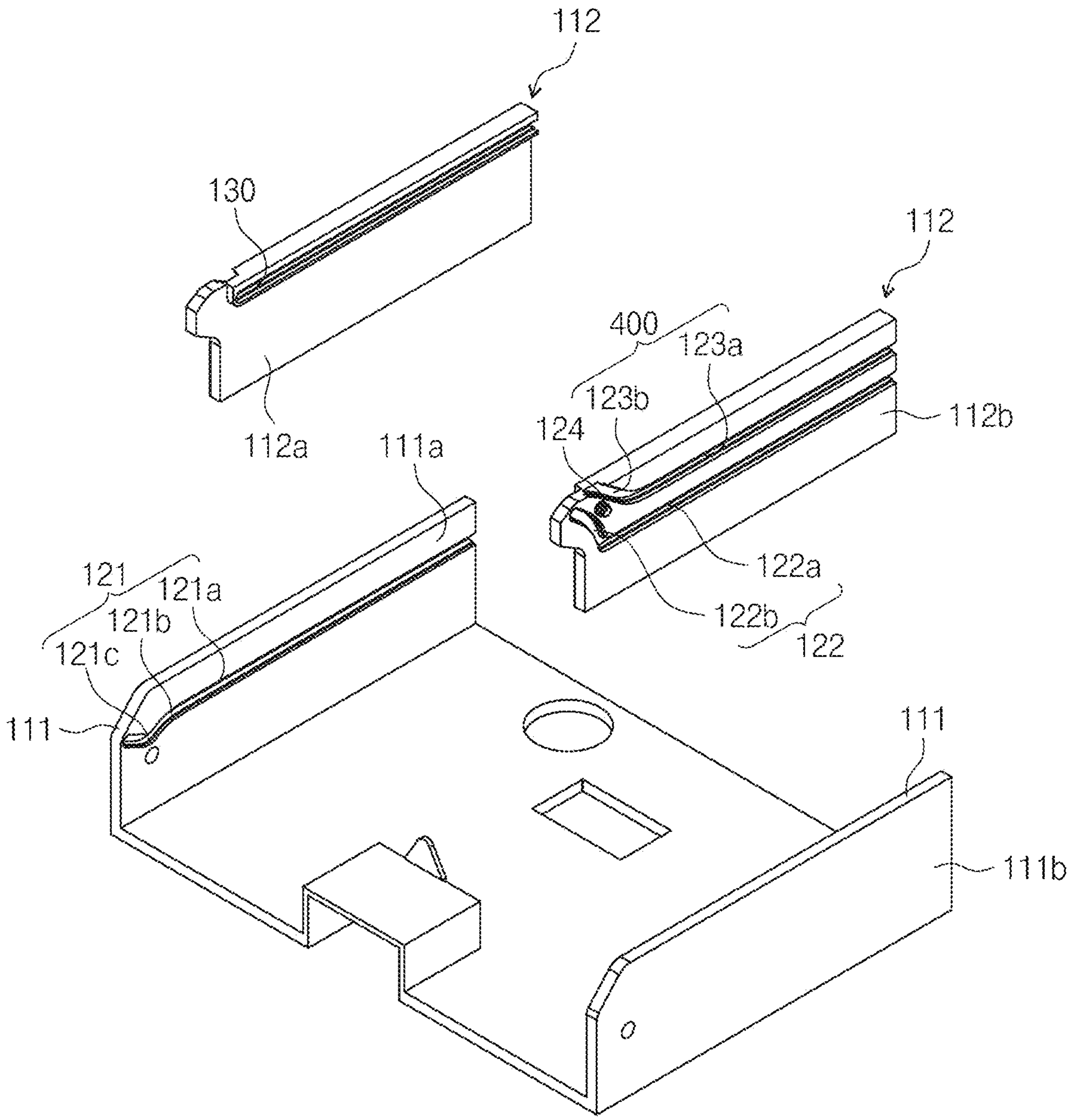
FIG. 7 is an exploded perspective view illustrating a base module of a display device according to an embodiment of the present disclosure.

FIG. 7 is an exploded perspective view illustrating the base module 100 of the display device 1000 according to an embodiment of the present disclosure. The rails (121, 122, 123, 130) formed on the guide wall 110 may be implemented as a plurality of rails, and may be configured with a first guide wall 111 and a second guide wall 112 to prevent the plurality of rails (121, 122, 123, 130) from overlapping each other.

A first surface 111*a* of the first guide wall 111 and a second surface 112*b* of the second guide wall 112 may be arranged to face each other, and a rotary arm 230 of the bending module 200 may be disposed between the first guide wall 111 and the second guide wall 112.

A bending guide pin 260 protruding laterally of the rotary arm 230 may be inserted into the bending guide rail 120. The bending guide rails (121, 122, 123) may be divisionally formed on the first surface 111*a* of the first guide wall 111 and the second surface 112*b* of the second guide wall 112. The bending guide rails (121, 122, 123) may include straight portions (121*a*, 122*a*, 123*a*) arranged parallel to each other; and inclined portions (121*b*, 122*b*, 122*c*) located at an end portion in the first direction and inclined upward or downward.

The rotary arm 230 may rotate as the positions of the first to third bending guide pins (261, 262, 263) change through the positions and angles of the inclined portions (121*b*,

122*b*, 122*c*). For example, the inclined portion 121*b* of the first bending guide rail 121 may face downward and the inclined portion 122*b* of the second bending guide rail 122 may face upward, so that the rotary arm 230 can rotate.

The guide wall 110 may include a slide rail 130 that guides the sliding movement of the slide module 300 in addition to the bending guide rails (121, 122, 123) that guide the driving of the bending module 200.

A first slide pin 370 may move along the slide rail 130 of the slide module 300. As illustrated in FIG. 7, the slide rail 130 may be formed on the first surface 112*a* of the second guide wall 112 so that the path of the slide pin 270 does not overlap with the driving of the rotary arm 230. Alternatively, the slide rail 130 may also be formed on the second surface 111*b* of the first guide wall 111 on which the bending guide rail 120 is not formed.

The display module 400 may include a bending module 200 and a slide module 300 for transitioning from a first state to a second state and from a second state to a third state or vice versa.

Figure 8:
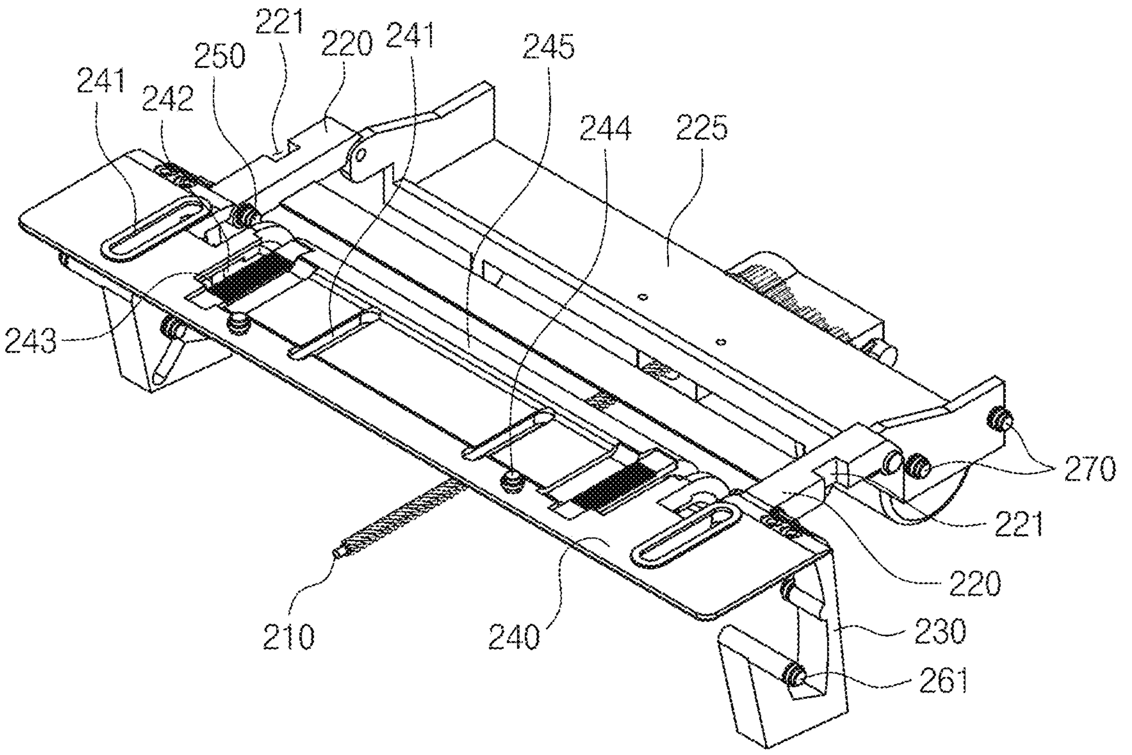
FIG. 8 is a perspective view illustrating a bending module of a display device when viewed from above according to an embodiment of the present disclosure.
Figure 9:
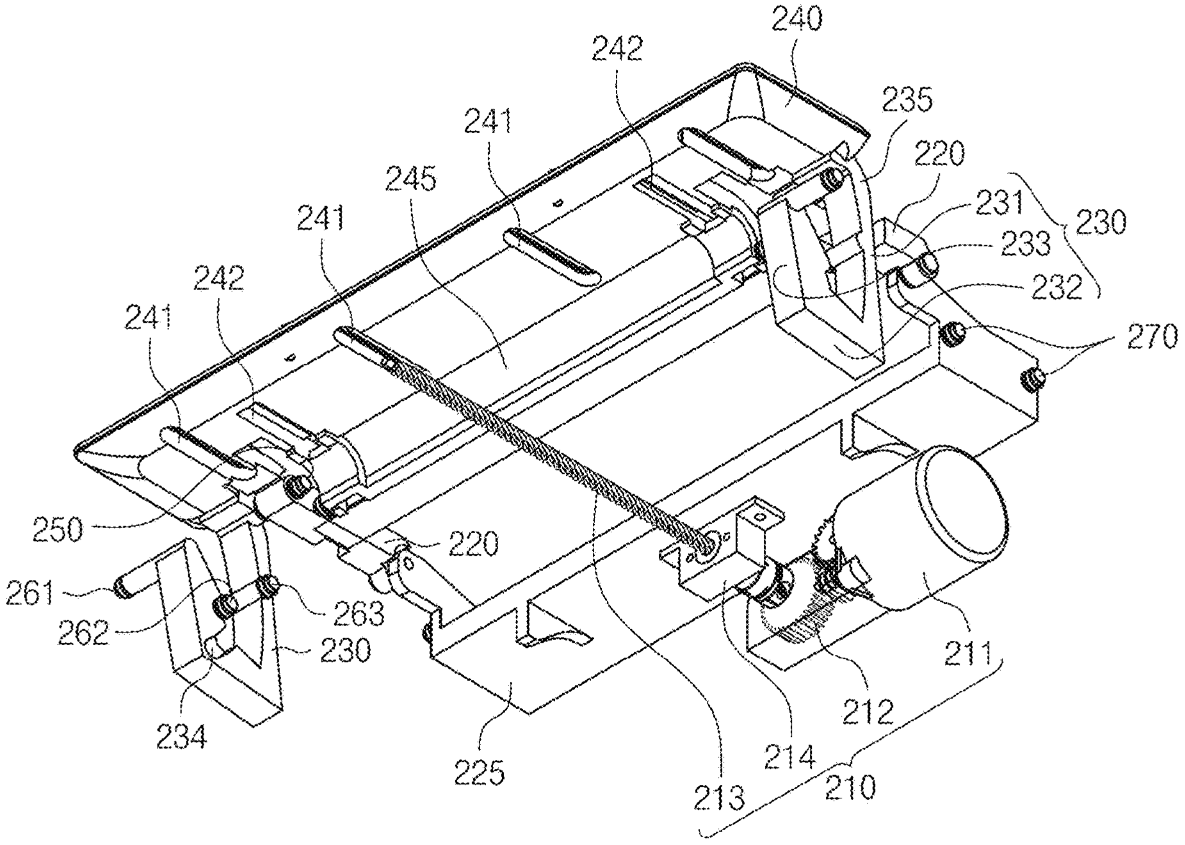
FIG. 9 is a perspective view illustrating a bending module of a display device when viewed from below according to an embodiment of the present disclosure.

FIG. 8 is a perspective view illustrating the bending module 200 of the display device 1000 when viewed from above according to an embodiment of the present disclosure. FIG. 9 is a perspective view illustrating the bending module 200 of the display device 1000 when viewed from below according to an embodiment of the present disclosure.

The bending module 200 pushes the first flat portion 401 of the display module 400 in the first direction to transition from the first state to the second state, and at the same time changes the angle of the first flat portion 401, thereby inducing bending deformation of the bendable portion 403. The bending module 200 may include a rear plate 240, a rotary arm 230, a bending link 220, and a first driver 210.

The rear plate 240 may be coupled to the rear surface of the first flat portion 401 of the display module 400. The rear plate 240 transmits the driving force of the bending module 200 to the first flat portion 401 through a pin-slot coupling to the first flat portion 401, while not interfering with the driving of the slide module 300.

When the bending module 200 is driven, the arrangement direction of the first flat portion 401 may change, and when the slide module 300 is driven, the display module 400 may slide independently of the rear plate 240 to transition from the second state to the third state.

The rear plate 240 may include a rear slot 241 extending in the first direction. The rear plate 240 may be pin-slot coupled to the first flat portion 401 through a rear pin 443 that penetrates the rear slot 241 and is coupled to the rear surface of the first flat portion 401 of the display module 400.

The rotary arm 230 may extend at a predetermined angle to the rear plate 240. When the rotary arm 230 rotates and the arrangement direction thereof changes, the arrangement of the rear plate 240 changes, so that transition from the first state to the second state can be performed.

A connection portion 235 between the rotary arm 230 and the rear plate (240) may support the bent portion of the bendable portion 403 in the second state, and may include a curve corresponding to the curvature of the bendable portion 403 so that the bendable portion 403 can be bent at a predetermined curvature.

The bending module 200 may include a flat support portion located on the first flat portion of the rear plate 240 and located on the rear surface of the flat cover 321; and a curved support portion 245 located at the end portion in the third direction opposite to the first direction of the flat support portion and having a curved surface corresponding to the curvature of the rotary arm 230 and the connection portion.

The rotary arm 230 may include a plurality of bending guide pins 260. The bending guide pins 260 are protrusions that are inserted into the bending guide rail 120 formed on the guide wall 110 and move along the bending guide rail 120. A bearing or a roller may be provided in the rotary arm 230, and may rotate on the outer surface of the rotary arm 230 so that the rotary arm 230 can easily move along the bending guide rail 120.

The first bending guide pin 261 that moves along the first bending guide rail 121 formed on the first surface of the first guide wall 111 and the second bending guide pin 262 that moves along the second bending guide rail 122 formed on the second surface of the second guide wall 112 may be formed in the opposite direction of the rotary arm 230.

The bending guide pin 260 may induce the rotational movement of the rotary arm 230 while moving along the bending guide rail 120. The first bending guide rail 121 and the second bending guide rail 122 may cross each other (see FIG. 12), and at the same time may change the arrangement of the rotary arm 230.

Although the rotational motion can be induced only using a two-point support including the first bending guide pin 121 and the second bending guide pin 122, the scope or spirit of the present disclosure is not limited thereto. For more stable support, the third bending guide rail 123 and the third bending guide pin 263 may be further included in the bending module.

Figure 12:
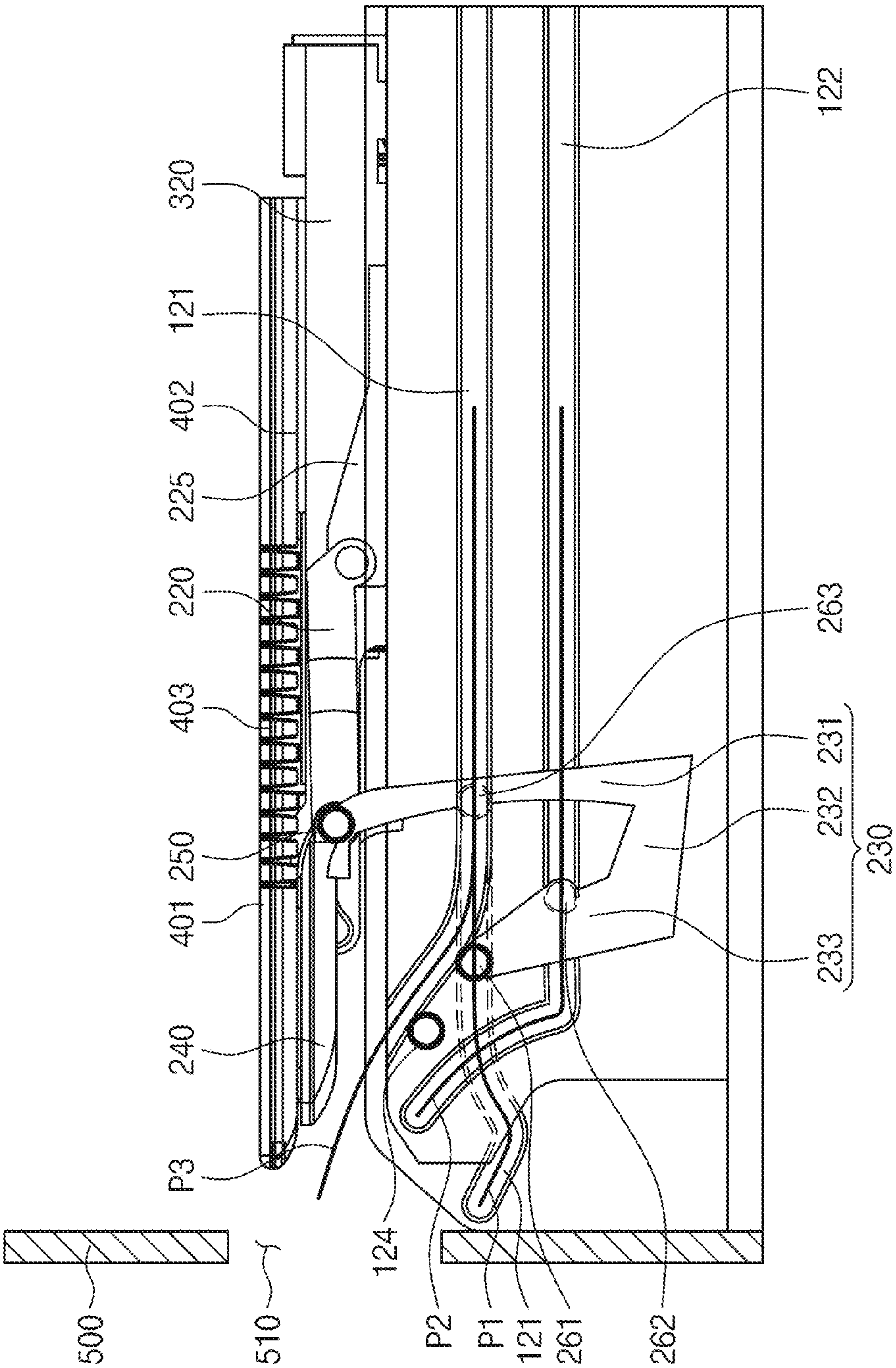
FIGS. 12 to 15 are side perspective views illustrating a process of transitioning from a first state to a third state of a display device according to an embodiment of the present disclosure.
Figure 13:
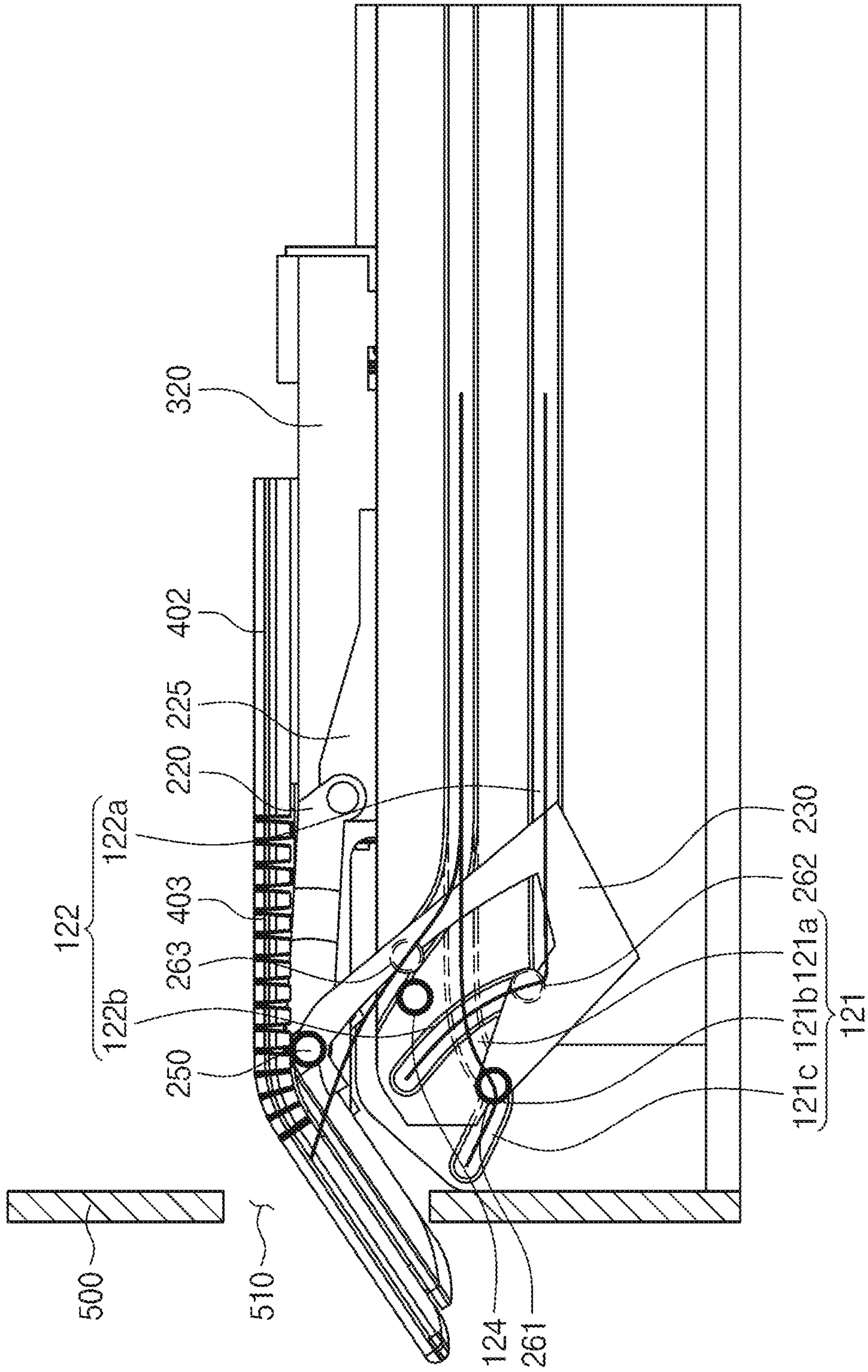
Figure 14:
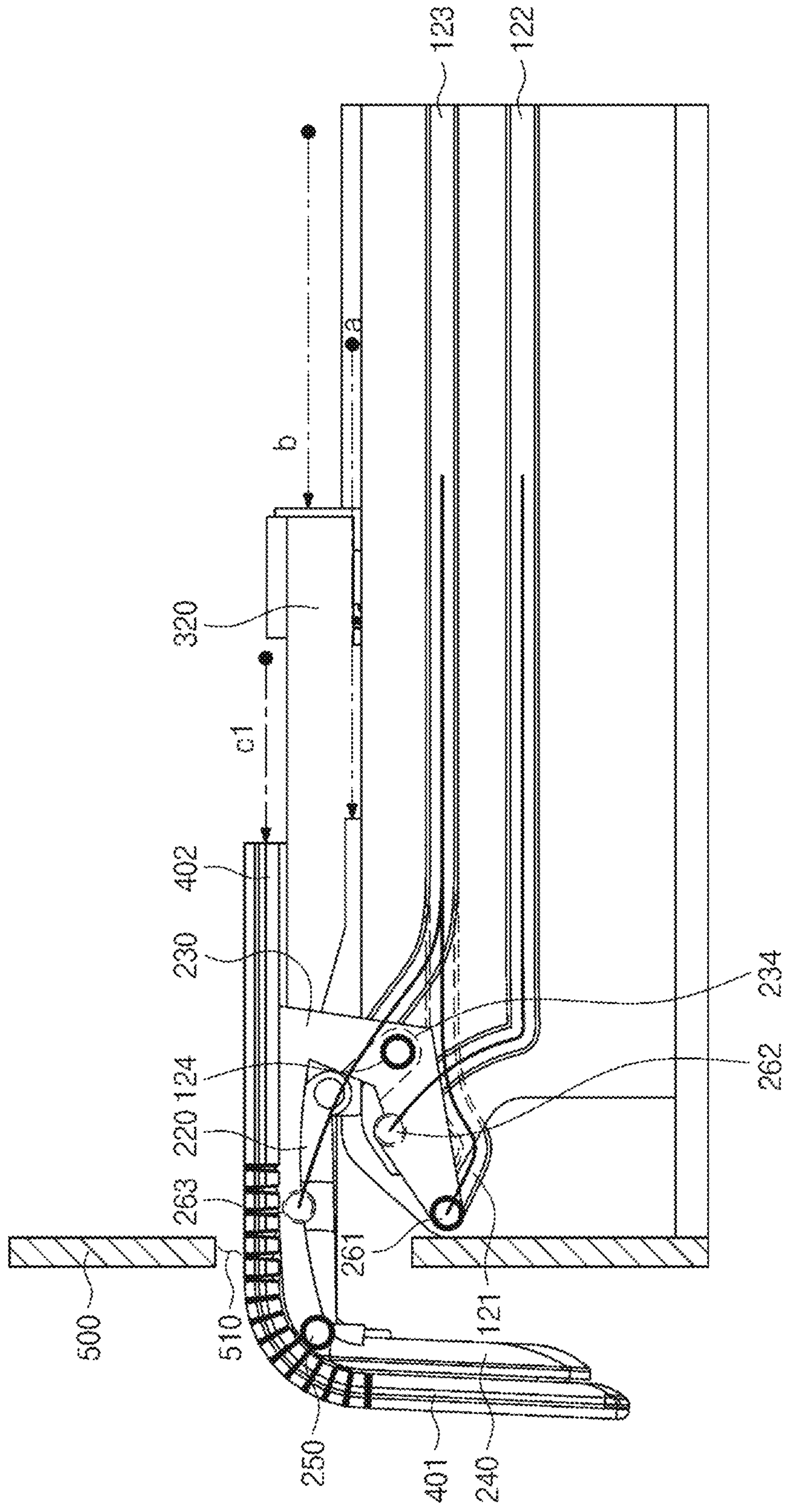

The three bending guide pins 260 may be arranged in a triangular shape to implement stable support. Referring to FIGS. 12 to 14, the rotation arm 230 can rotate as the positions of the three bending guide pins 260 change in the first state and the second state.

The rotary arm 230 may be rotatably connected to one end of the bending link 220 through the rotary shaft 250. The rotary arm 230 receives power from the first driver 210 through the bending link 220 and rotates independently of the bending link 220, thereby inducing bending deformation of the variable unit 403.

The first driver 210 may be fixed to the base module 100, and may include a first motor 211, a first gear block 212, a first ball screw 213, and a first driving nut 214. The bending module may include a first gear block 212 that transmits the rotational power of the first motor 211 to the first ball screw 213. When the first ball screw 213 extending in the first direction rotates, the first drive nut 214 through which the first ball screw 213 passes moves in the extension direction of the first ball screw 213 and the first-directional position may be changed.

The first drive nut 214 is coupled to the drive frame 225, and the drive frame 225 may include a second slide pin 270 coupled to the slide rail 130 formed on the guide wall 110 so that the driving frame 225 can be driven only in the first direction.

The slide rail 130 along which the second slide pin 270 moves may be configured to move along the same slide rail 130 as the first slide pin 370 that guides the first-directional slide movement of the slide module 300.

The bending link 220 provides the rotary arm 230 with the driving force of the first driver 210 so that the rotary arm 230 can move in the first direction of the first driver 210 or can move in the third direction opposite to the first direction. The rotary arm 230 may convert the driving force of the first driver 210 provided in a linear direction into a rotational movement through the bending guide rail 120 and the bending guide pin 260. A detailed description of the driving of the rotary arm 230 will be given later with reference to FIGS. 12 to 15.

Figure 10:
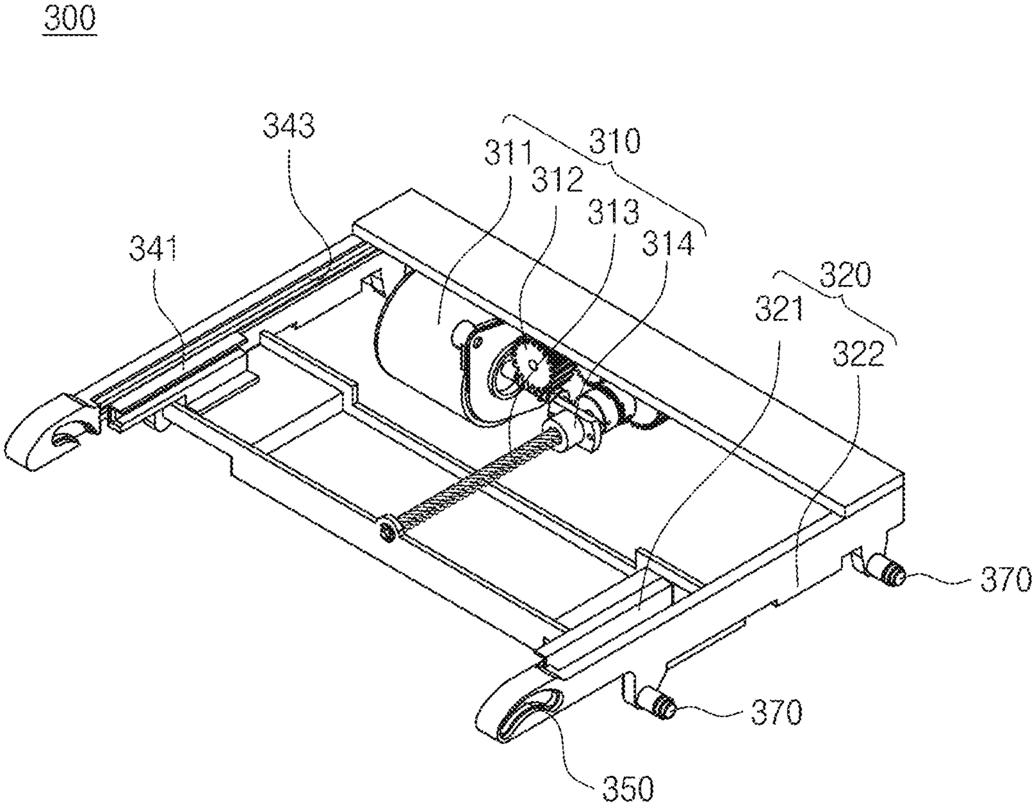
FIG. 10 is a perspective view illustrating a slide module of a display device when viewed from above according to an embodiment of the present disclosure.

FIG. 10 is a perspective view illustrating the slide module 300 of the display device 1000 when viewed from above according to an embodiment of the present disclosure.

When the slide module 300 transitions from the second state to the third state, the slide module 300 pushes the second flat portion 402 of the display module 400 in the first direction so that the first flat portion 401 moves further in the second direction, thereby increasing the exposed area of the display module 400.

The slide module 300 may include a slide frame 320 connected to the bending link 220 of the bending module 200 through a rotary shaft 250, and a second driver 310 fixed to the slide frame 320.

The second driver 310 may include a second motor 311, a second ball screw 313 that rotates by receiving power from the second motor 311 and extends in a first direction, and a second gear block 312 including a plurality of gears configured to transmit the power of the second motor 311 to the second ball screw 313.

The slide module may include the second driving nut 314 through which the second ball screw 313 passes so that the second driving nut 314 moves in the first direction. A ball bearing may be interposed between the second drive nut 314 and the second ball screw 313. The ball bearing reduces a gap between the second driving nut 314 and the second ball screw 313 and reduces frictional force between the second driving nut 314 and the second ball screw 313, so that the second drive nut 314 can smoothly move. The second drive nut 314 may be coupled to a nut fastening portion 430 located on the second flat cover 422 (see FIG. 11) of the display module 400.

Figure 11:
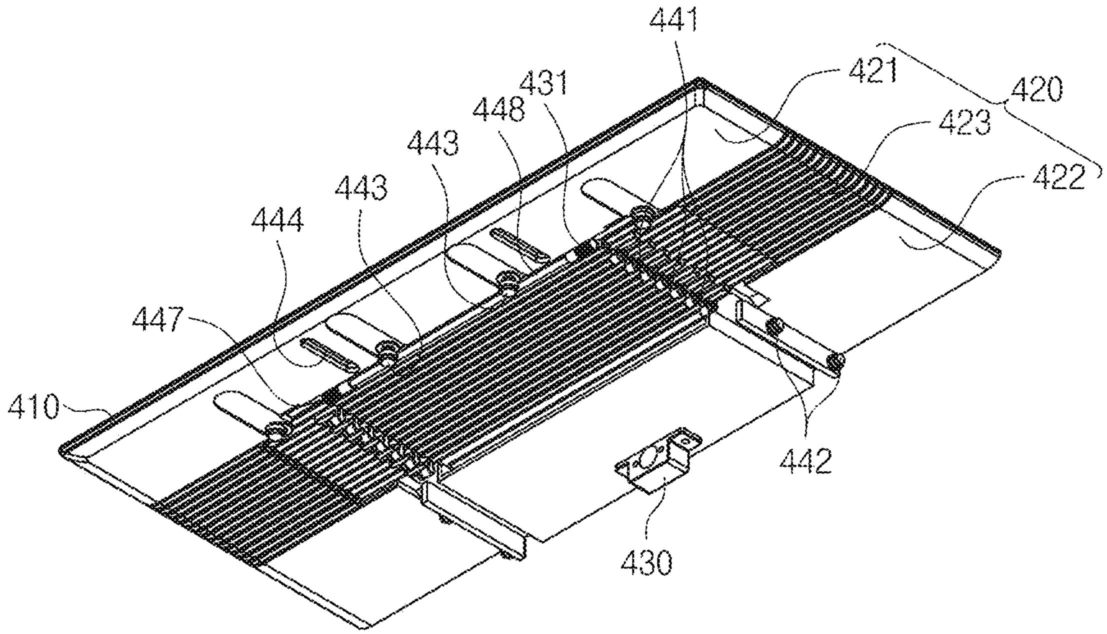
FIG. 11 is a perspective view illustrating a slide module of a display device when viewed from below according to an embodiment of the present disclosure.

FIG. 11 is a perspective view illustrating the slide module 300 of the display device 1000 when viewed from below according to an embodiment of the present disclosure.

The display panel 410 may include a first flat portion 401, a second flat portion 402, and a bendable portion 403 disposed therebetween. The bending module 200 provides power to the first flat portion 401, and the slide module 300 provides power to the second flat portion 402.

The panel cover 420 located on the rear surface of the flexible display panel 410 may include a first flat portion 401, flat covers 421, 422 supporting the rear surface of the second flat portion 402, and a plurality of bending bars 423 located on the rear surface of the bendable portion 403.

A plurality of rear pins 443 inserted into the rear slots 241 of the rear plates 240 of the bending module 200 may be located on the rear surface of the first flat portion 401. When the slide module 300 pushes the second flat portion 402 in the second direction during transition from the second state to the third state, the slide module 300 pushes the first flat portion 401 to move in the second direction, and the rear pin 443 moves in the second direction along the rear slot 241.

The driving of the rear pin 443 and the rear slot 241 will be described in more detail with reference to the driving of the slide module 300 of FIGS. 20 and 21.

In contrast to the rear pin 443 and the rear slot 241, a sub rear slot 241 located on the rear surface of the display module 400 and a sub rear pin 443 protruding from the rear plate 240 may be included in the slide module.

A panel gear 447 located on the first flat cover 421 may be engaged with a panel rack gear 243 located on the rear plate 240 to prevent the display module 400 from being pushed when the display module 400 is driven in a sliding manner.

The panel gear 447 may be implemented as one pair of panel gears as shown in FIG. 11, and may be connected to a gear shaft 448 for synchronization of the pair of panel gears 447.

The bendable portion 403 has a plurality of bending bars 423 extending in a horizontal direction to support the rear surface of the display panel 410, and the angle between the bending bars 423 may change, and the curvature of the bendable portion 403 may also change. The bending bars 423 may be connected to neighboring bending bars 423 using a flexible material.

The bending bars 423 may include a first display pin 441 on the rear surface thereof. The first display pin 441 may be formed in a hook shape that protrudes from the rear surface of the bending bars 423 and is bent laterally.

When the first display pin 441 is formed on each of the bending bars 423, a spacing between the first display pins 441 may be too narrow, so that the bending bars 423 according to the present disclosure are arranged in a manner that a bending bar 423 having the first display pin 441 and another bending bar 423 without the first display pin 441 are alternately arranged to provide a movable space in which the first display pin 441 can move while bending the bendable portion 403.

Figure 24:
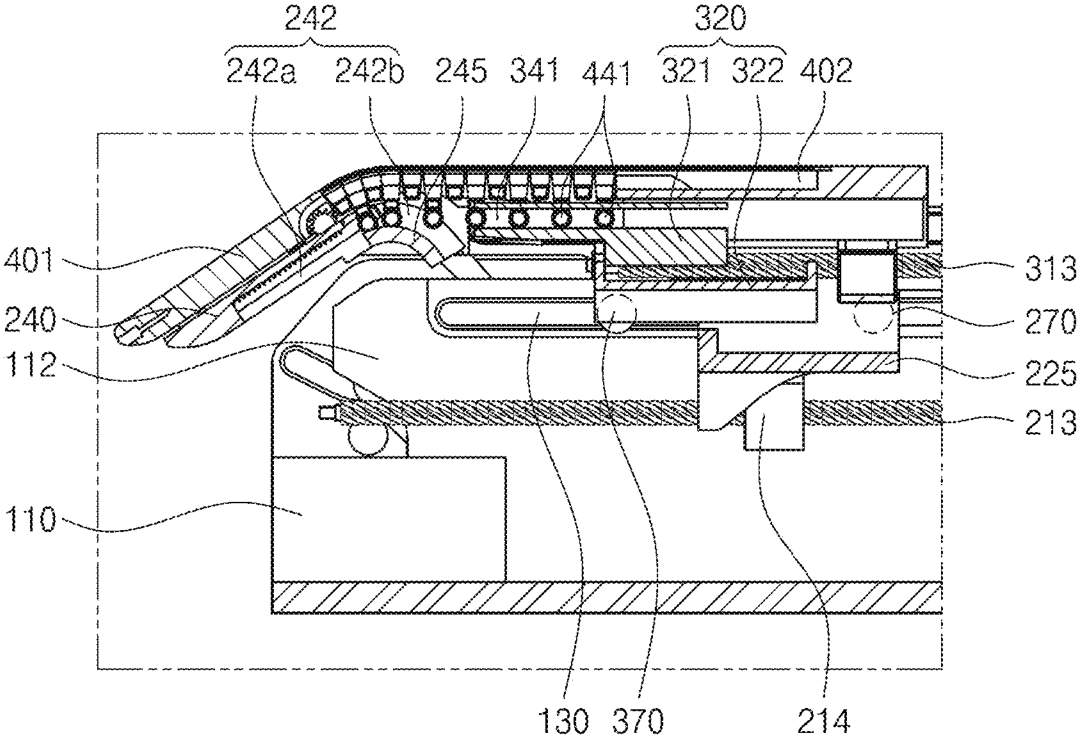
Figure 25:
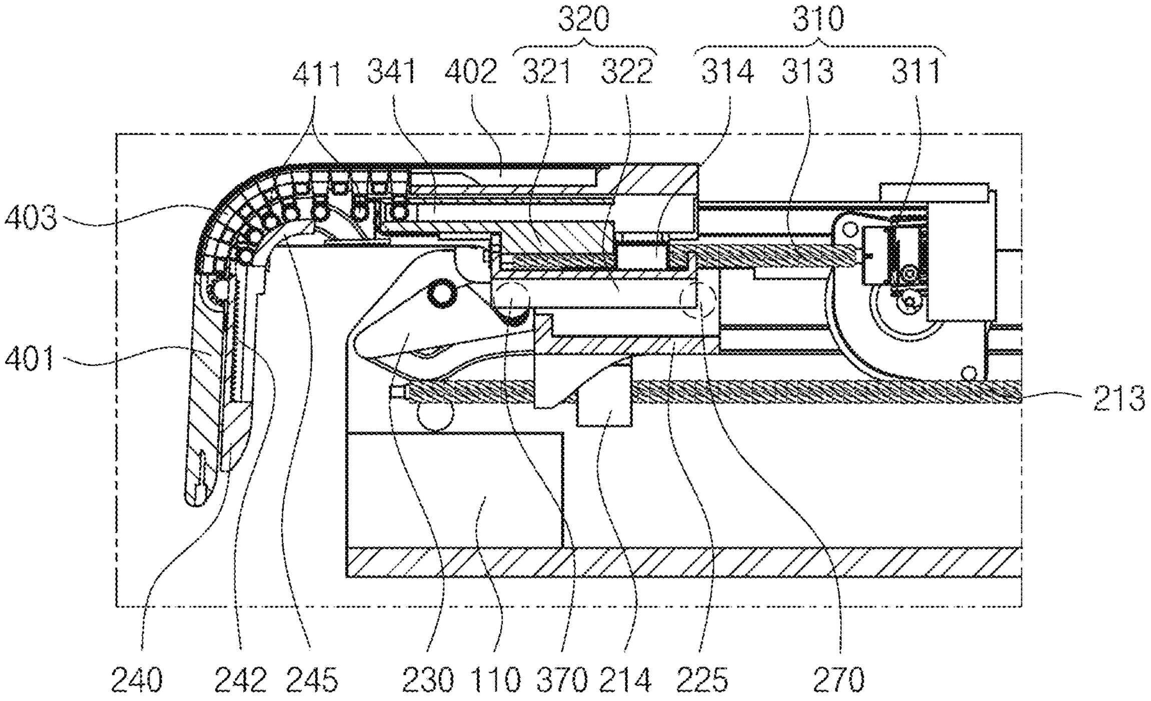

The first display pin 441 moves along the first display rail 341 formed in the slide module 300 in the first state (see FIG. 24). When transitioning from the first state to the second state, the first display pin 441 moves to the second display rail 242 of the rear plate 240 and can move along the second display rail 242 (see FIGS. 25 and 26).

Figure 26:
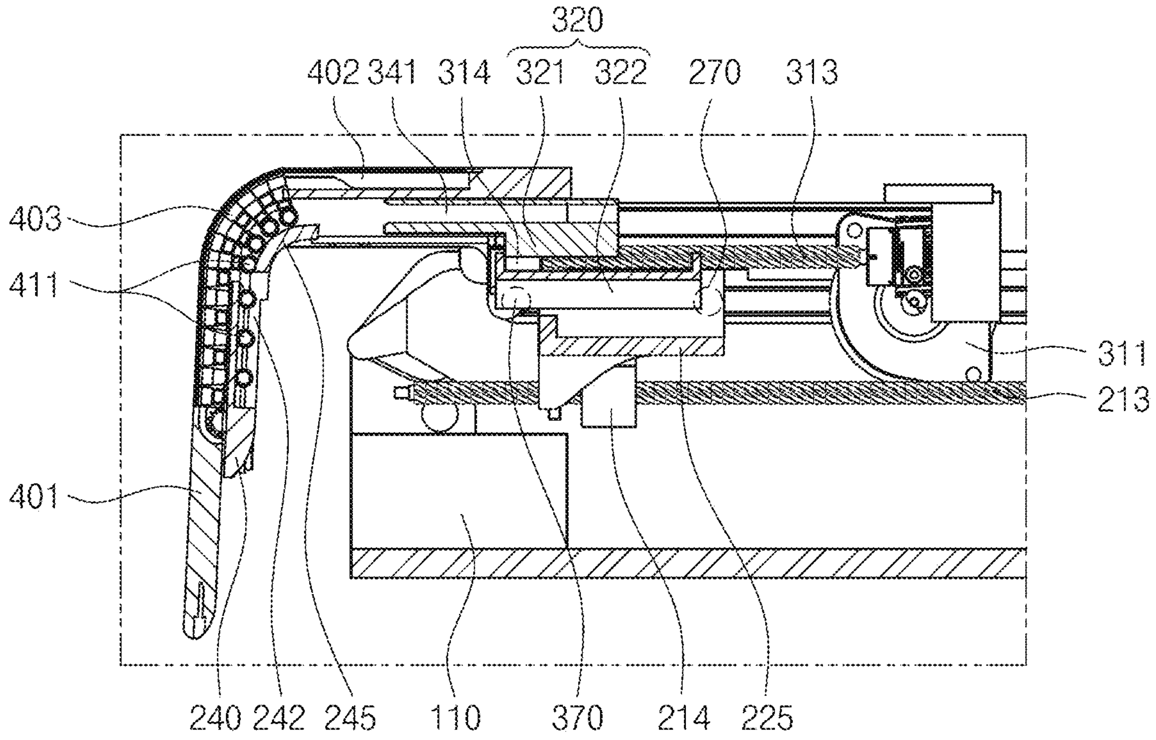

When transitioning from the second state to the third state, the first display pin 441 can move in the second direction along the second display rail 242 (see FIG. 26). The driving of the first display pin 441 will be described in more detail with reference to FIGS. 23 to 26.

Figure 15:
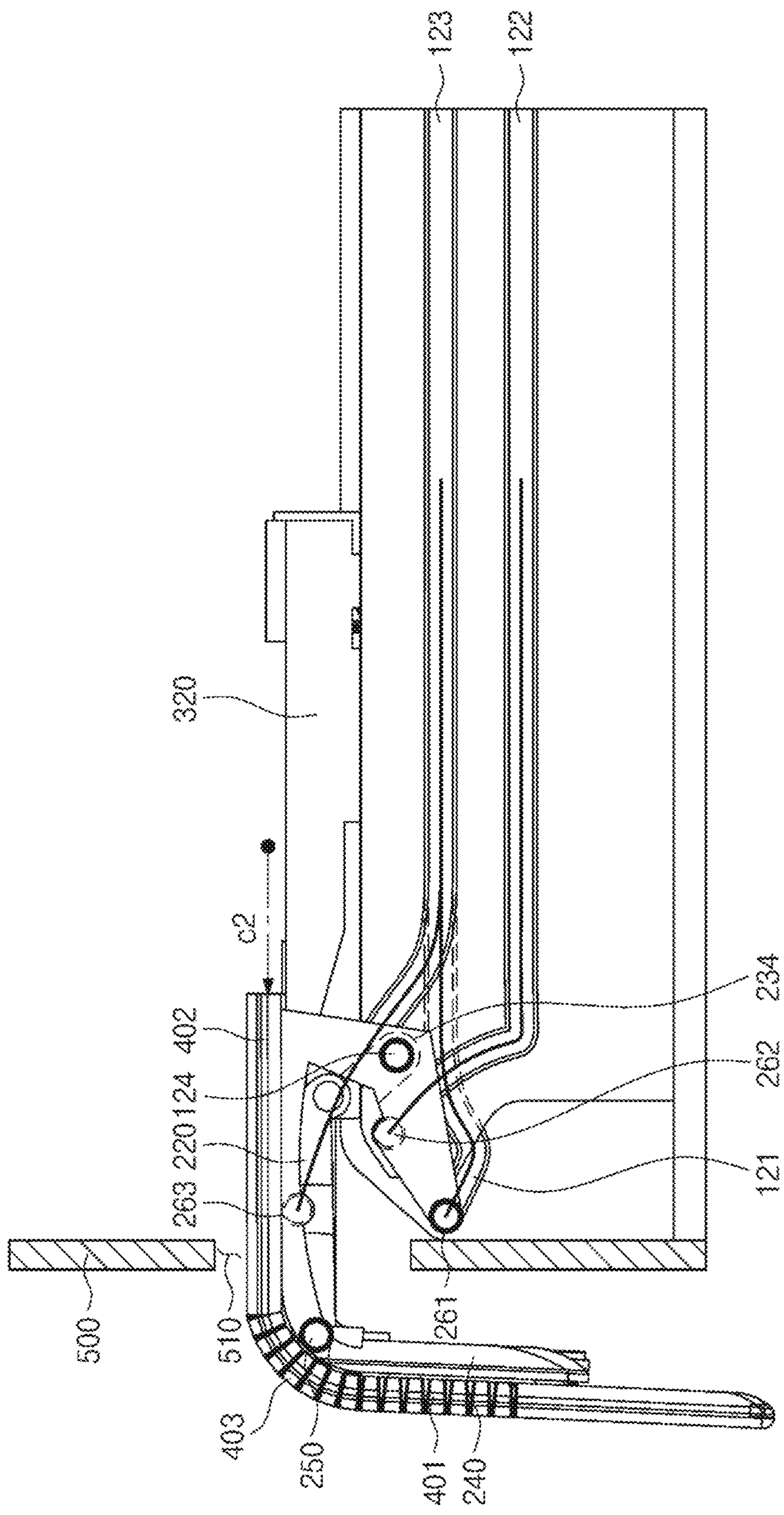

FIGS. 12 to 15 are side perspective views illustrating a process of transitioning from a first state to a third state of the display device 1000 according to an embodiment of the present disclosure. FIG. 12 illustrates the first state, and FIG. 13 illustrates an intermediate process for transitioning from the first state to the second state. FIG. 14 illustrates the second state, and FIG. 15 illustrates the third state.

In the first state in which the first flat portion 401 and the second flat portion 402 form the same plane and the bendable portion 403 is not bent, the following description will be given based on the position of the first driver 210 and the position of the second driver 310.

When the first motor 211 of the first driver 210 is driven, the first ball screw 213 rotates and the first driving nut 214 pushes the driving frame 225 in the first direction. The bending link 220 may also move in the first direction together with the driving frame 225, and the rotary arm 230 connected to the bending link 220 through the rotary shaft 250 may also move while receiving force in the first direction.

The first-directional driving force received by the rotary arm 230 may be converted into force for rotating the rotary arm 230 as the plurality of guide pins moves along the guide rail. In this case, since the rotary arm 230 is coupled to the bending link 220 through the rotary shaft 250, the rotary arm 230 can rotate independently of the bending link 220.

The rotary arm 230 may include a first arm 231 connected to the rear plate 240, a second arm 232 extended forward from the first arm 231, and a third arm 233 bent upward from the second arm 232. The first arm 231 extends in a direction away from the display module 400 in the first state illustrated in FIG. 12, and supports the rear surface of the display module 400 in the second state and the third state illustrated in FIGS. 14 and 15.

Accordingly, the angle between the rear plate 240 and the first arm 231 of the rotary arm 230 may have an angle corresponding to the arrangement angle of the first flat portion 401 and the second flat portion 402 in the second state and the third state.

In particular, as shown in FIG. 14, the bendable portion 403 that is not yet bent in the second state and forms the same plane as the second flat portion 402 (facing the upper surface) may be supported by the rotary arm 230. Since one end of the first arm 231 connected to the rear plate 240 has a curvature corresponding to the bending curvature of the bendable portion 403, one end of the first arm 231 may support the bent portion of the bendable portion 403 in the second state and the third state.

Referring to FIG. 12, the second arm 232 may extend after being bent from the other end of the first arm 231 in the first direction, and the third arm 233 may be bent upward from the end of the second arm 232. The third arm 233 is a part for arranging the second bending guide pin 262 and the third bending guide pin 263, and the second arm 232 connects the third arm 233 and the first arm 231 to each other.

The rotary arm 230 may be configured in a form that extends from the first arm 231 to the position where the second bending guide pin 262 and the third bending guide pin 263 are formed, without the need for the first arm 231, the second arm 232, and the third arm 233 to have a U-shape and be bent. However, there is a problem that the size and weight of the rotary arm 230 unavoidably increase.

In addition, as shown in FIGS. 14 and 15, there is a problem that the fixed slot 234 in which the fixed pin 124 supporting the rotary arm 230 is seated becomes excessively long when the driving of the bending module (200) is completed, so that the rotary arm 230 may be configured in a U-shaped form.

The rotary arm 230 may include a first bending guide pin 261 and a second bending guide pin 262 that protrude laterally at different positions. As shown in FIG. 9, the first bending guide pin 261 and the second bending guide pin 262 are located to face in different directions.

The first bending guide pin 261 may move along the first bending guide rail 121 formed on the first surface of the first guide wall 111 while drawing the path of P1. The second bending guide pin 262 may move along the second guide rail formed on the second surface of the second guide wall 112 while drawing the path of P2.

In the first state of FIG. 12, the first bending guide pin 261 is located above the second bending guide pin 262, but in the second state of FIG. 14, the rotary arm 230 rotates so that the second bending guide pin 262 is located above the first bending guide pin 261.

The first bending guide pin 261 is located on the straight section 121*a* of the first bending guide rail 121 in the first state. When the first driver 210 is driven, the first driver 210 moves in the first direction along the first bending guide rail 121 and reaches the inclined portion 121*b*, and the inclined portion 122*b* of the first bending guide rail 121 is inclined downward.

The inclined portion 121*b* of the first bending guide rail 121 and the inclined portion 122*b* of the second bending guide rail 122 may cross each other as shown in the side perspective view of FIG. 12. However, since the first bending guide rail 121 and the second bending guide rail 122 are formed on different guide walls 110, the first bending guide pin 261 and the second bending guide pin 262 may move without interfering with each other.

When the first bending guide pin 261 moves downward along the inclined portion 121*a* of the first bending guide rail 121, the second bending guide pin 262 is still located at the straight portion 122*a* of the second bending guide rail 122, so that the rotary arm 230 starts to rotate.

As shown in FIG. 13, when the first bending guide pin 261 reaches the lower end 121*c* of the inclined portion 121*a* of the first bending guide rail 121, the first bending guide pin 261 stops for a moment, and the second bending guide pin 262 moves along the inclined portion 121*d* facing upward of the second bending guide rail 122, so that the rotary arm 230 can rotate.

The inclined portion of the first bending guide rail 121 may have a V-shape that bends upward from the bottom, and when the first bending guide pin 261 and the second bending guide pin 262 reach the first-directional ends of the first bending guide rail 121 and the second bending guide rail 122, the rotation of the rotary arm 230 is completed.

When the rotation of the rotary arm 230 is controlled by two guide pins, there may occur problems in which the rotary arm is not smoothly bent and shaking or twisting of the rotary arm occurs. In order to more stably support the rotary arm 230 and perform the rotational movement of the rotary arm 230, a third bending guide pin 263 and a third bending guide rail 123 may be further included.

The third bending guide pin 263 may be driven more stably when arranged to form a triangle with the first bending guide pin 261 and the second bending guide pin 262. Therefore, the third bending guide pin 263 may be located on the first arm 231 to be spaced apart from the third arm 233 on which the first bending guide pin 261 and the second bending guide pin 262 are formed.

The third bending guide rail 123 on which the third bending guide pin 263 can move may be formed on the first guide wall 111 or the second guide wall 112. Since the straight portion of the third bending guide rail 123 according to the present embodiment has the same height as the straight portion of the first bending guide rail 121, the straight portion of the third bending guide rail 123 may be formed on the second guide wall 112 on which the second bending guide rail 122 is formed.

However, the first arm 231 may transition from the second state to another state in which the first arm 231 is separated from the guide wall 110 and supports the rear surface of the display module 400 as shown in FIG. 14. The third bending guide pin 263 is located on the first arm 231, so that the third bending guide pin 264 moves along the trajectory (P3) of FIG. 12, and is located on the rear surface of the display module 400 in the second state as shown in FIG. 14.

Since the third bending guide pin 263 has the same horizontal height as the bending link 220 in the second state, the bending link 220 may form a pin groove 221 at a position corresponding to the third bending guide pin 263 in the second state to avoid interference with the bending link 220.

The trajectory (P3) of the third bending guide pin (263) may overlap the display module 400 as shown in FIG. 13, so that the guide wall 110 cannot be enlarged to form the length of the third bending guide rail 123 to the end.

Therefore, when the bendable portion 403 is bent at a certain angle as shown in FIG. 13, the third bending guide pin 263 deviates from the third bending guide rail 123 and is located on the rear surface of the display module 400 in the second state as shown in FIG. 14. When the third bending guide pin 263 deviates from the third bending guide rail 123 in the second state, there is a problem that the stable three-point support described above cannot be achieved.

In the second state, the fixed pin 124 inserted into the fixed slot 234 to support the rotary arm 230 may be formed in the guide wall 110. Referring to FIG. 7, the fixed pin 124 may be formed in the second guide wall 112, and the fixed slot 234 may be formed in the second arm 232 as illustrated in FIG. 9.

In the second state, the fixed pin 124 may be seated on the end of the fixed slot 234, and the position of the rotary arm 230 may be stably fixed. If the rotary arm 230 does not have a U-shape and the first arm 231 and the third arm 233 are connected to each other, the fixed slot 234 may increase in length.

Figure 16:
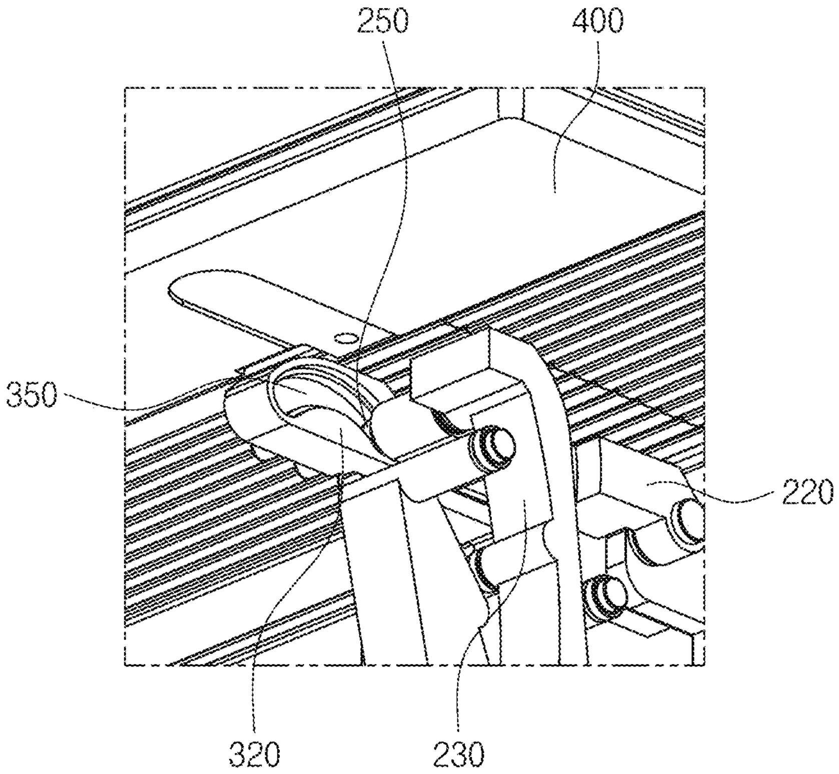
FIG. 16 is a perspective view illustrating a shaft slot and a rotary shaft in a first state of a display device according to an embodiment of the present disclosure.

FIG. 16 is a perspective view illustrating the shaft slot 350 and the rotary shaft 250 in the first state of the display device 1000 according to an embodiment of the present disclosure.

Figure 17:
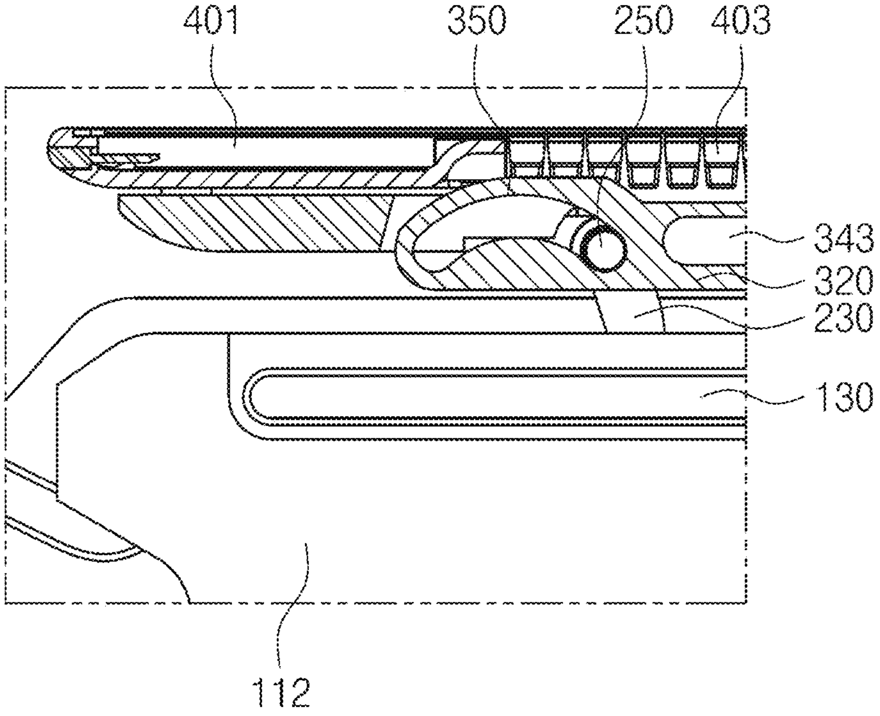
FIG. 17 is a side view illustrating a shaft slot and a rotary shaft in a first state of a display device according to an embodiment of the present disclosure.
Figure 18:
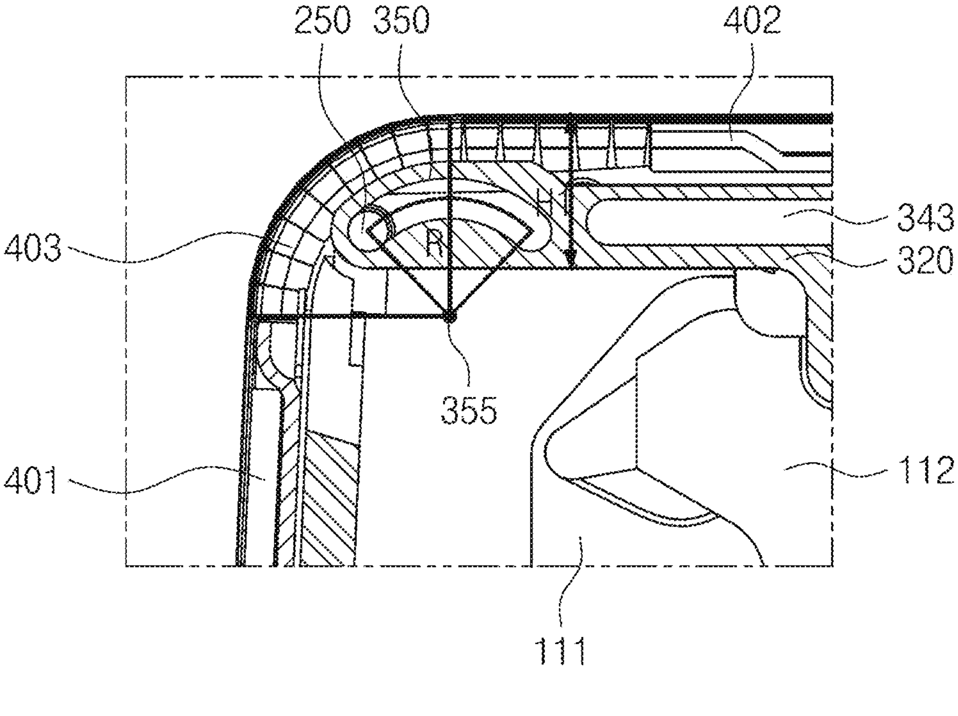
FIG. 18 is a side view illustrating a shaft slot and a rotary shaft in a second state of a display device according to an embodiment of the present disclosure.

FIG. 17 is a side view illustrating the shaft slot 350 and the rotary shaft 250 in the first state of the display device 1000 according to an embodiment of the present disclosure. FIG. 18 is a side view illustrating the shaft slot 350 and the rotary shaft 250 in the second state of the display device 1000 according to an embodiment of the present disclosure.

The shaft slot 350 is a slot having an arch shape formed in a slide frame 320, and the center 355 of the shaft slot 250 may be located outside the slide frame 320.

The rotary shaft 250 may not be fixed to a specific point, but may move and rotate while drawing the arch shape. In order to guide the arch trajectory movement of the rotary shaft 250, the rotary shaft 250 may be inserted into the arch-shaped shaft slot 350 and may move and rotate along the shape of the shaft slot 350.

When the rotary shaft 250 transitions from the first state to the second state at the end of the third direction opposite to the first direction of the shaft slot 350, the rotary shaft 250 may move to the first-directional end portion of the shaft slot 350. When transitioning from the first state to the second state, the position of the rotary shaft 250, which is the fastening position of the slide frame 320 and the bending link 220, may change.

Referring to FIG. 14, when the first driver 210 is driven to transition from the first state to the second state, the first-directional movement distance of the slide frame 320 may be shorter than the first-directional movement distance of the driving frame 225 (see FIG. 14). A difference (a-b) in movement distance between the movement distance (a) of the driving frame 225 and the movement distance b of the slide frame 320 may correspond to the extension length of the shaft slot 350.

The first flat portion 401 of the display module 400 is connected to the bending module 200, and the second flat portion 402 is connected to the slide module 300. Therefore, the slide module 300 moves backward (in the third direction) by the length of the shaft slot 350 with respect to the bending module 200. As a result, the second flat portion 402 must be moved in the first direction with respect to the slide module 300. The second driver 310 of the slide module 300 may move the second flat portion 402 in the first direction with respect to the slide frame 320.

In addition, since the radius of curvature of the bendable portion 403 is larger than that of the curved support portion 245, the second flat portion 402 of the display module 400 is pulled further in the first direction by the radius of curvature of the bendable portion 403. In order to compensate for the deviation of the slide movement distance due to the radius of curvature that occurs when the display module 400 is bent, the first driver 210 slides the second flat portion 402 in the second direction by at least the length of the shaft slot 350.

Therefore, the movement distance (c) of the second flat portion 402 by the second driver 310 may be larger than the difference between the movement distance (a) of the driving frame 225 and the movement distance (b) of the slide frame 320 (c>a−b).

The rotary shaft 250 moves along the arch-shaped shaft slot 350, and the center of the trajectory along which the rear plate 240 and the rotary arm 230 rotate may be the same as the center 355 of the shaft slot 350.

As shown in FIG. 18, the center of rotation 355 of the rear plate 240 and the rotary arm 230 corresponds to the center of curvature 355 of the curved surface of the bendable portion 403 and coincides with the center of curvature 355 of the arch shape of the shaft slot 350. The center of curvature 355 of the curved surface of the bendable portion 403 may be located outside the rotary arm 230 and the rear plate 240.

Figure 19:
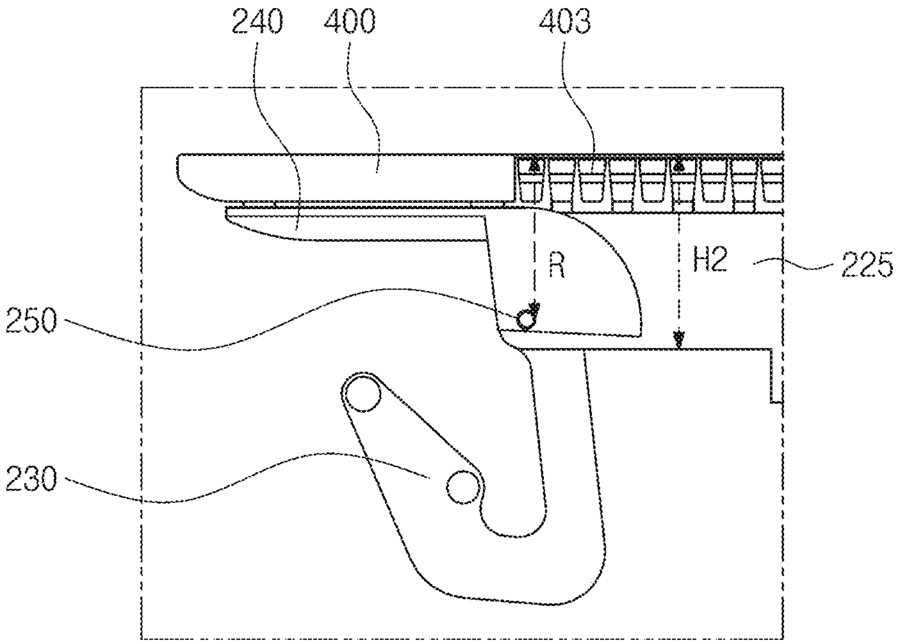
FIG. 19 is a view illustrating a second state of a display device when there is no shaft slot.
Figure 19:
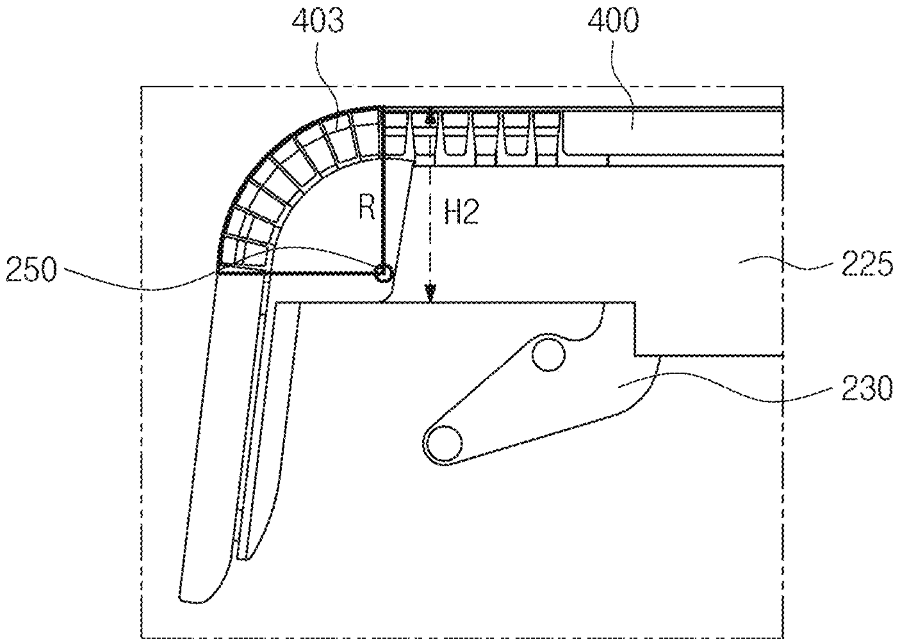

FIG. 19 illustrates an example case in which the rotary arm 230 receives the driving force of the first driver 210 of the bending module 200 and moves in the first direction, and the rotary shaft 250 is fixed during rotation of the rotary arm 230.

Unlike the embodiments of FIGS. 17 and 18, the rear plate 240 and the rotary arm 230 rotate around the fixed rotary shaft 250, and the center of curvature of the curved surface of the bendable portion 403 may correspond to the rotary shaft 250.

As a result, the rear plate 240 and the bending module 200 fixing the rear plate 240 become thicker, as illustrated in FIG. 16. Since the rear plate 240 passes through the panel opening 510 of the housing 500 in the second state and the third state and is located outside the panel opening 510, the size of the panel opening 510 should be increased as the thickness of the rear plate 240 increases. As the size of the panel opening 510 increases, there is a problem in that internal components are visible through the panel opening 510 even in the first state.

The rotation trajectory drawn by the rotary shaft 250 moving along the arch-shaped shaft slot 350 rotates about a virtual center 355 located outside the rear plate 240 or the rotation arm 230. Therefore, the display device 1000 can implement the rotation arm 230 and the rear plate 240, each of which is thinner than those of the embodiment of FIG. 19, and the size of the panel opening 510 can also be reduced.

After the driving of the bending module 200 is completed and the transition to the second state is completed, the first flat portion 401 may move further in the second direction as shown in FIG. 5, so that the bending module 200 may transition from the second state to the third state in which the area of the display module 400 facing forward increases.

Figure 20:
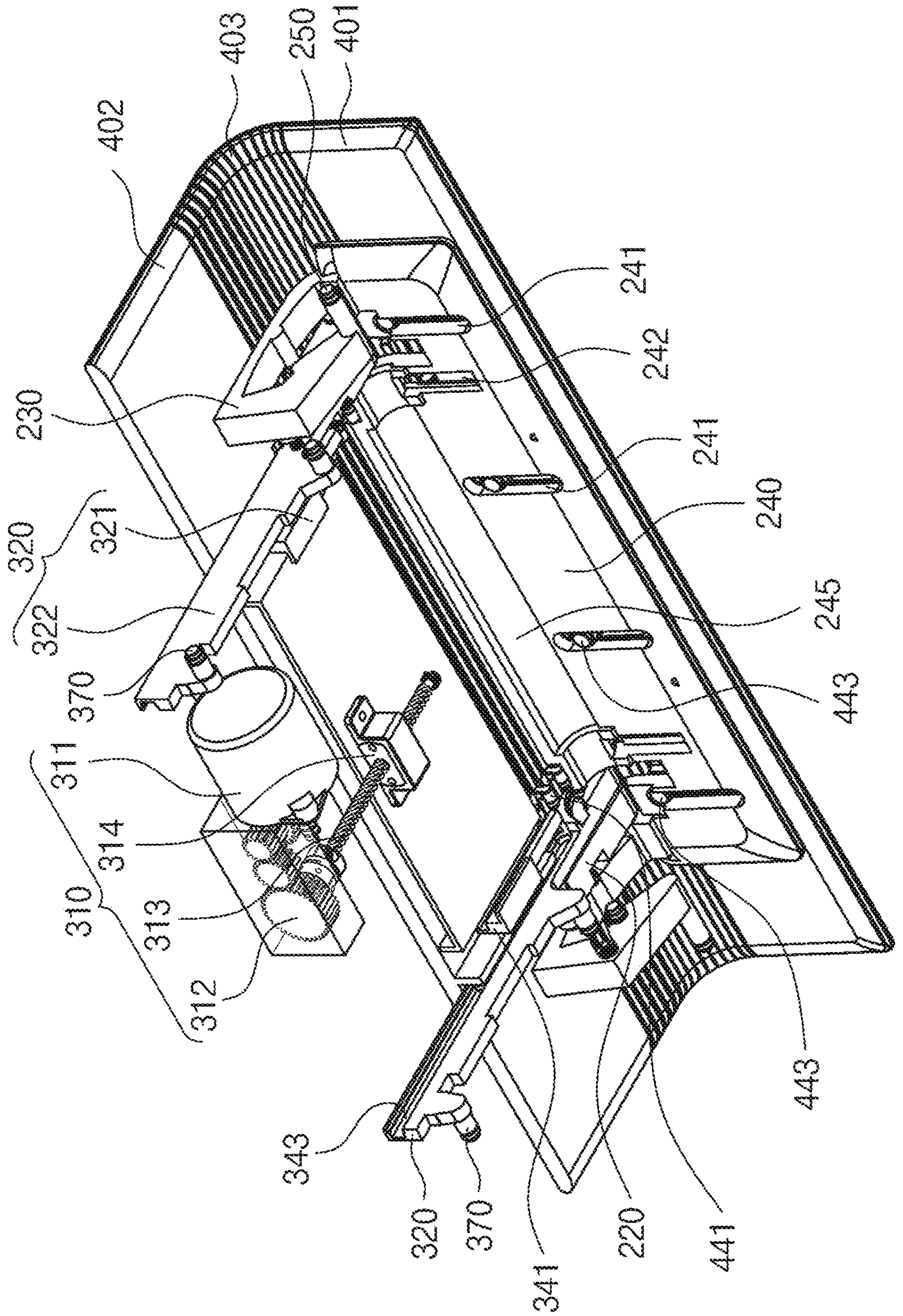
FIG. 20 is a perspective view illustrating the slide module and the display module when viewed from below in a second state of the display device according to one embodiment of the present disclosure.
Figure 21:
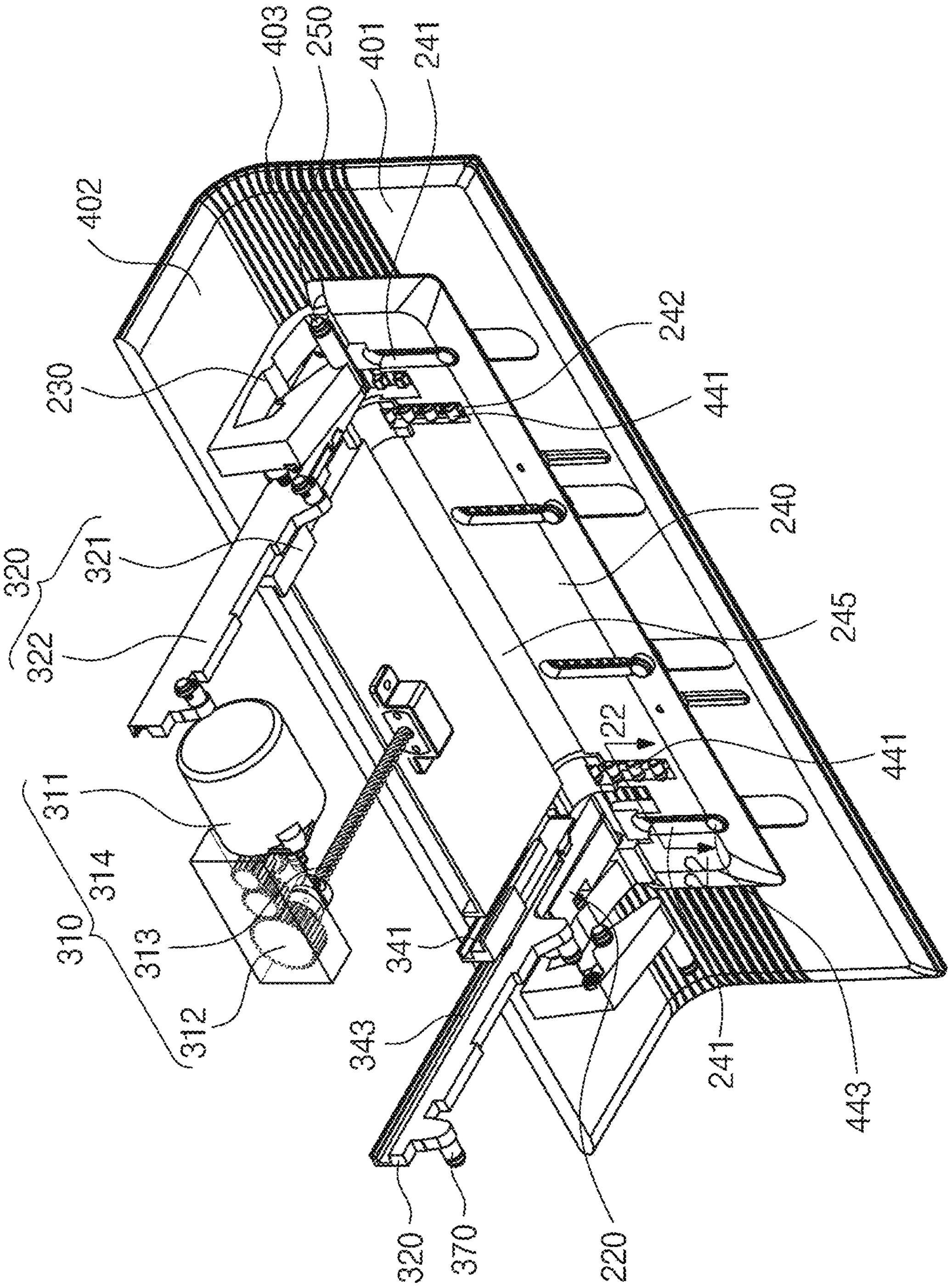
FIG. 21 is a perspective view illustrating the slide module and the display module when viewed from below in a third state of the display device according to one embodiment of the present disclosure.

FIG. 20 is a perspective view illustrating the slide module 300 and the display module 400 when viewed from below in the second state of the display device 1000 according to one embodiment of the present disclosure. FIG. 21 is a perspective view illustrating the slide module 300 and the display module 400 when viewed from below in the third state of the display device 1000 according to one embodiment of the present disclosure.

As illustrated in FIG. 14, the first driver 210 is driven primarily even when transitioning to the second state, and the display module 400 moves by a certain distance (c1) with respect to the slide frame 320.

When transitioning from the second state to the third state, the driving of the first driver 210 of the bending module 200 is terminated, and only the second driver 310 of the slide module 300 is driven to move the display module 400. At this time, the display module 400 may slide relative to the bending module 200.

The rear plate 240 through which the display module 400 connects the first flat portion 401 to the bending module 200 may include a plurality of rear slots 241 extending in the first direction (or in the second direction in the second state), so that the display module can slide in a fixed state of the rear plate 240 and structures protruding from the rear surface of the first region of the display module 400 can move in the first direction.

The display pin protruding from the rear surface of the first flat portion 401 is inserted into the rear slot 241, and the display pin may move in the longitudinal direction of the rear slot 241. In the second state, as shown in FIG. 20 (upper side in the drawing), when transitioning to the third state, the display pin may move to the other end (lower side in the drawing) as shown in FIG. 21.

The rear pin 443 is located at one end of the rear slot 241 in the first state in the same manner as in the second state, and may transition to the second state while being located at one end of the rear slot 241. The force of rotation generated when the bending module 200 moves in the first direction can be transmitted to the first flat portion 401 of the display module 400 through the rear slot 241 and the rear pin 443.

When transitioning from the second state to the third state in the rear slot 241, the movement distance of the rear pin 443 may correspond to the driving distance of the second driver 310.

Figure 22:
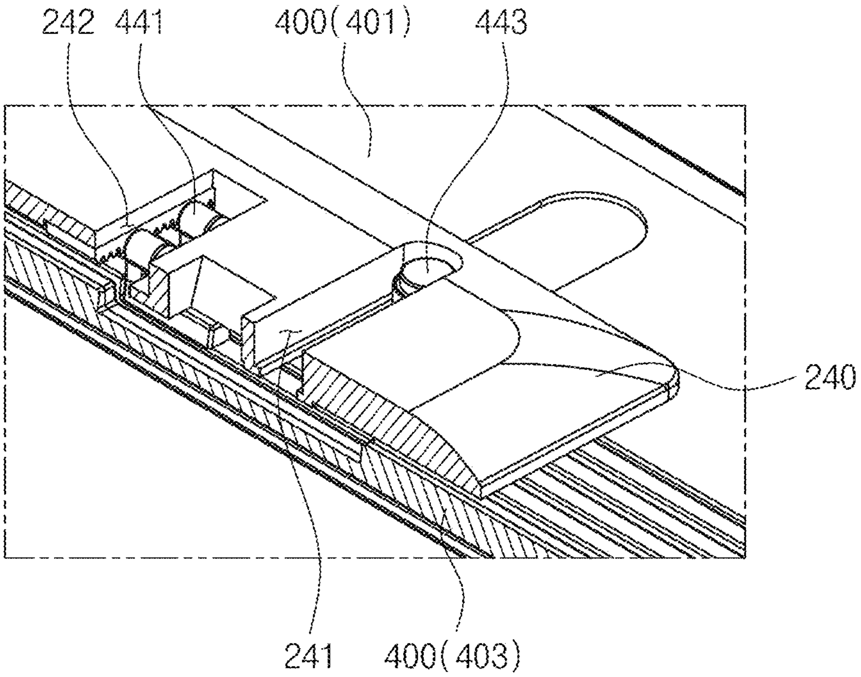
FIG. 22 is a cross-sectional perspective view illustrating a rear slot and a rear pin of the display device according to one embodiment of the present disclosure.

FIG. 22 is a C-C cross-sectional perspective view of FIG. 20, illustrating the rear slot 241 and the rear pin 443 of the display device 1000 according to one embodiment of the present disclosure. Referring to FIG. 22, the rear slot 241 has a smaller width at a portion that contacts the display module 400, and each of the roller or the bearing that are mounted on the rear pin 443 increases in width, thereby preventing the rear pin 443 from being separated from the rear slot 241.

After the rear plate 240 is seated on the rear surface of the first flat portion 401, the rear pin 443 can be fixed to the rear surface of the first flat portion 401 by penetrating the rear slot 241. In order to enable stable sliding movement of the display module 400, two or more the rear pin 443 and two or more the rear slot 241 may be included in the display module 400.

Referring to FIG. 8, the rear plate 240 may further include an auxiliary rear pin 244 protruding toward a first plane of the display module 400. The auxiliary rear pin 244 is inserted into the auxiliary rear slot 444 (see FIG. 11) formed in the first flat portion 401, and may move in the longitudinal direction of the auxiliary rear slot 444.

The auxiliary rear slot 444 and the auxiliary rear pin 244 are not fastening structures of the rear plate 240 and the display module 400, but simply serve to assist the sliding movement in the second direction when transitioning from the second state to the third state.

Figure 27:
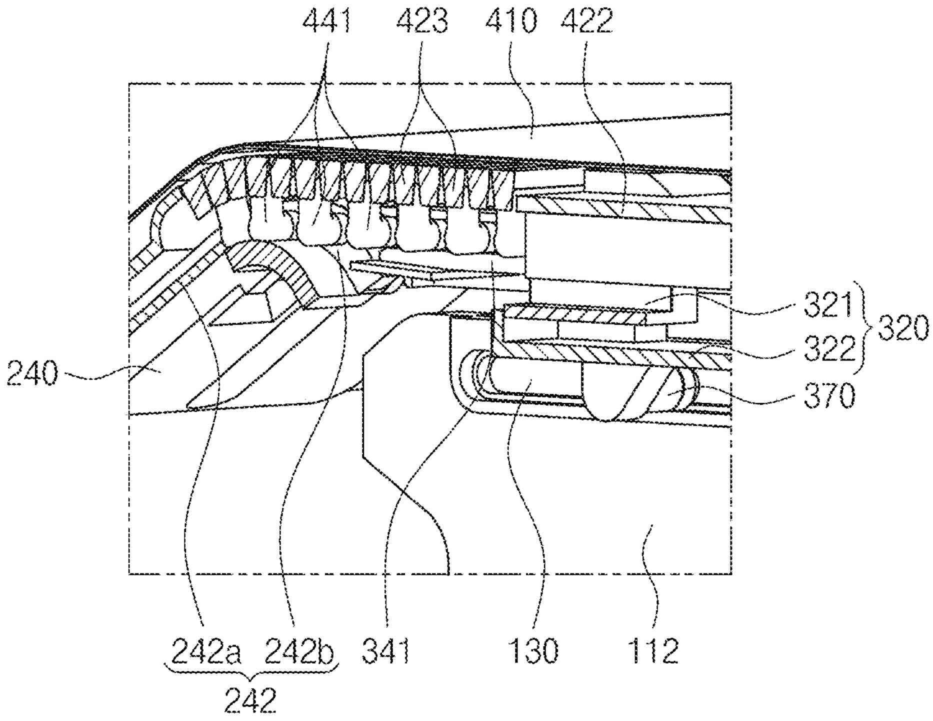
FIG. 27 is a cross-sectional perspective view illustrating a first display pin and a second display rail in the state of FIG. 24.

FIGS. 23 to 26 are cross-sectional views illustrating a process of transitioning from the first state to the third state of the display device 1000 according to one embodiment of the present disclosure. FIG. 27 is a cross-sectional perspective view illustrating the first display pin 441, the first display rail 341, and the second display rail 242 which are in the state of FIG. 24.

The first display pin 441 may be formed in a hook shape that protrudes from the rear surface of the bending bar 423 and may be bent laterally. The first display pin 441 may include a roller or a bearing on the outer circumferential surface for smooth sliding movement.

The first display rail 341 and the second display rail 242 are also open in the lateral direction, and the first display pin 441 can move while contacting at least one of the upper surfaces (i.e., the surface adjacent to the display module 400) and the lower surface (i.e., the surface spaced apart from the display module 400) of the first display rail 341 and the second display rail 242.

A plurality of first display pins 441 protruding from the rear surface of the bendable portion 403 may be provided. The entire first flat portion 401 is formed of a single solid material. As a result, even if the combined rear pins 443 are arranged such that one rear pin 443 is located at the left side and the other rear pin 443 is located at the right side, the sliding movement of the first flat portion 401 can be sufficiently guided.

However, since the bendable portion 403 is composed of a plurality of bending bars 423 adjacent to each other in the first direction, the number of first display pins 441 is greater than the number of rear pins 443 so that each bending bar 423 can slide without being separated from the support structure at the rear surface. In the present embodiment, an example is illustrated in which one rear pin 443 is provided on both sides for each of two bending bars 423.

When the rear pins are respectively provided on the adjacent bending bars 423, there may occur a problem that the rear pins contact each other. When the rear pins are too far apart from each other, it may be difficult to guide the sliding movement while forming the bending shape of the bendable portion 403.

Figure 23:
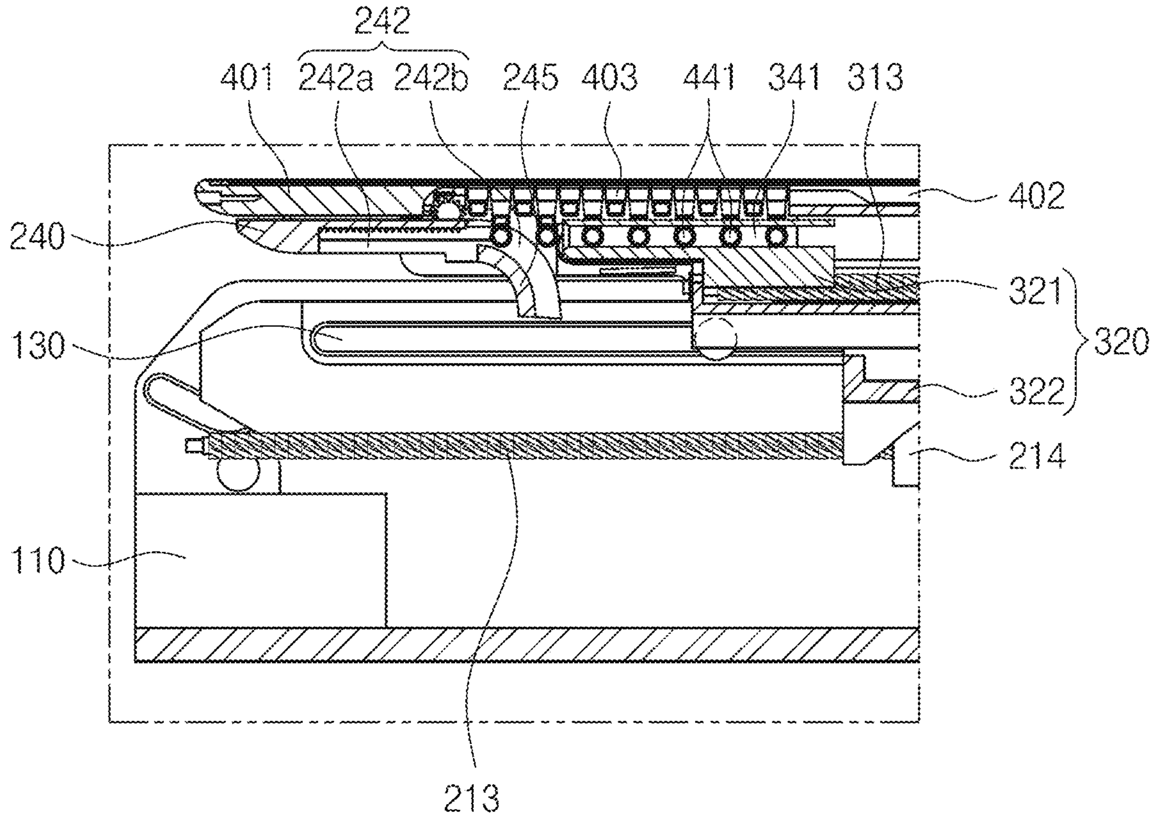
FIGS. 23 to 26 are cross-sectional views illustrating a process of transitioning from the first state to the third state of the display device according to one embodiment of the present disclosure.

The first display pin 441 may be located on the first display rail 341 formed on the slide frame 320 in the first state as shown in FIG. 23. The first display rail 341 forms a straight line, and only guides the linear movement in the first direction of the first display pin 441.

When transitioning from the first state to the second state, the first display pin 441 may be separated from the end of the first direction of the first display rail 341 as shown in FIG. 24, and may move to the second display rail 242 of the rear plate 240, thereby changing the curvature of the bendable portion 403.

The second display rail 242 is formed on the rear plate 240, and when the display module 400 transitions from the second state to the third state, the first display pin 441 can move in the second direction along the second display rail 242 (see FIG. 26).

The rear plate 240 may include a curved support portion 245 having a curved surface corresponding to the shape of the connection portion 235 of the rotary arm 230 at the end portion in the third direction. The second display rail 242 extends to the curved support portion 245, and a portion located on the rear surface of the bendable portion 403 of the second display rail 242 has a curve corresponding to the shape of the curved support portion 245.

However, as shown in FIGS. 24 and 27, when bending is performed, the upper surface of the second display rail 242 (i.e., the surface facing the rear surface of the display module 400) is opened so that the first display pin 441 moves from the first display rail 341 to the second display rail 242.

When the second display rail 242 does not extend to the curved support portion 245, it may be difficult for the first display pin 441 to move from the first display rail 341 to the second display rail 242. Therefore, the portion **242*b* of the second display rail 242 formed on the curved support portion 245 serves to guide the first display pin 441 to move stably to the second display rail 242**.

In the second state, the area of the bendable portion 403 facing the upper surface is wider than the area facing the front surface (the surface in the first direction), so that the first display pin 441 is partially located on the first display rail 341.

When the second driver 310 pushes the second flat portion 402 in the first direction, the first display pin 441 moves to the second display rail 242, and the area of the bendable portion 403 facing forward increases. The bendable portion 403 pushes the first flat portion 401 in the second direction, so that the bendable portion 403 may transition to a third state in which the area of the display module 400 facing forward is maximized as shown in FIG. 26.

The second flat portion 402 is connected to the second driving nut 314 of the second driver 310 and can move in the first direction. The second flat portion 402 may further include a second display pin 442 protruding from the rear surface of the second flat portion 402 so that the first-directional movement of the second flat portion 402 is stably performed without twisting.

The second display pin 442 may move along the third display rail 343 formed on the slide frame 320. As shown in FIG. 11, the second display pin 442 is located on the solid first flat cover 421, so that a smaller number of display pins 442 compared to the number of first display pins 441 may be used. The display module according to the present embodiment includes a total of four second display pins 442 including two second display pins located at the left side and two other second display pins located at the right side.

Referring to FIG. 10, third display rails 343 that are open in the lateral direction may be formed facing each other on both sides. When the first display pin 441 and the second display pin 442 are arranged at consecutive positions in the first direction, the first display rail 341 and the third display rail 343 may be connected to each other.

However, as shown in FIG. 11, the first display pin 441 and the second display pin 442 may be located on different planes, and in this case, referring to FIG. 10, the side of the slide frame 320 may be divided into a first side surface 321 and a second side surface 322 so that the second display rail 242 and the first display rail 341 may also be located on different planes.

The third display rail 343 and the first display rail 341 may be spaced apart from each other in the lateral direction of the display device 1000 so that the second display pin 442 may pass through the space between the third display rail 343 and the first display rail 341.

As described above, the display device 1000 according to the present disclosure can be pulled out (withdrawn) when necessary, and may be inserted when not in use.

In addition, according to the present disclosure, when the display device 1000 is inserted, the display device 1000 is installed in the horizontal direction, and when the display device 1000 is pulled out (withdrawn), the display device 1000 is installed in the vertical direction. As a result, even when there is no space in the vertical storage, the display device 1000 can be installed.

The display device 1000 according to the present disclosure may implement a slim bending module 200 supporting the rear surface of the display module 400, so that the panel opening 510 formed in the housing 500 can be reduced in size.

In addition, the display device 1000 according to the present disclosure can stably perform bending operation through the three-point support of the rotary arm 230.

In addition, the display device 1000 according to the present disclosure can reduce the bezel size of the left and right sides of the display module 400 by positioning the sliding guide structure of the display module 400) in the backward direction of the display module 400.

As is apparent from the above description, the display device according to the present disclosure may allow a display module to be withdrawable when necessary or to be retractable when unnecessary.

In addition, the display device according to the present disclosure is located in a horizontal direction when inserted (retracted) or is located in a vertical direction when withdrawn (pulled out), so that even if there is no space for a vertical storage in the vehicle, the display device can be installed in the vehicle.

In addition, the display device according to the present disclosure can reduce the size of the opening formed in a housing by implementing the structure of a bending module supporting a rear surface of the display module slimly.

In addition, the display device according to the present disclosure can stably perform a bending operation by supporting a rotary arm at three points.

In addition, the display device according to the present disclosure can reduce the size of a bezel on the left and right sides of the display module by positioning the sliding guide structure of the display module in a backward direction of the display module.

The above detailed description should not be construed as being limitative in all terms, but should be considered as being illustrative. The scope of the present disclosure should be determined by reasonable analysis of the accompanying claims, and all changes in the equivalent range of the present disclosure are included in the scope of the present disclosure.

What is claimed is:

1. A bendable display device comprising:

a display module including a first flat portion, a second flat portion, and a bendable portion disposed between the first flat portion and the second flat portion;

a bending module configured to bend and deform the bendable portion so that the first flat portion transitions from a first state in which the first flat portion faces a first direction to a second state in which the first flat portion faces a second direction; and a slide module including a sliding frame, and configured to slide the second flat portion in the first direction so that the first flat portion transitions from the second state to a third state in which the first flat portion further moves in the second direction, wherein the bending module includes a rear plate provided with a rear slot into which a rear pin formed on a rear surface of the first flat portion is inserted, wherein, when transitioning from the second state to the third state, the rear pin slides on the rear slot, wherein the rear plate includes:

a flat support portion on which the rear slot is formed; and a curved support portion extending in a third direction from the flat support portion and curved in a direction away from the display module, and wherein the curved support portion supports a rear surface of the bendable portion in the second state and the third state.

2. The bendable display device according to claim 1, further comprising:

a first display rail formed on the sliding frame;

a second display rail formed on the rear plate and consecutively arranged in the first direction with respect to the first display rail; and a first display pin configured to protrude from the rear surface of the bendable portion, wherein the first display pin moves from the first display rail to the second display rail when transitioning from the first state to the second state.

3. The bendable display device according to claim 2, wherein the second display rail is configured such that a front surface of a portion formed on the curved support portion is open.

4. The bendable display device according to claim 2, further comprising:

a third display rail formed in the slide module; and a second display pin protruding from a rear surface of the second flat portion and inserted into the third display rail to slide.

5. The bendable display device according to claim 4, wherein the slide module includes:

a first slide frame in which the third display rail is formed; and a second side frame in which the second display rail is formed, wherein a gap through which the second display pin passes is formed between the first slide frame and the second slide frame.

6. The bendable display device according to claim 1, wherein the slide module is driven such that the second flat portion slides in the first direction during operation of the bending module.

7. The bendable display device according to claim 1, further comprising:

a panel rack gear extending in the first direction and formed on a front surface of the rear plate; and a panel gear located on a rear surface of the display module and engaged with the panel rack gear, wherein, when transitioning from the second state to the third state, the panel gear moves in a longitudinal direction of the panel rack gear on the panel rack gear.

8. The bendable display device according to claim 1, further comprising:

a base module including a guide wall that has a slide rail formed on a side surface thereof; and a first slide pin formed in the slide module and inserted into the slide rail to move.

9. The bendable display device according to claim 8, wherein the bending module includes a second slide pin inserted into the slide rail and moved in the first direction.

10. The bendable display device according to claim 1, wherein the bending module includes:

a rotary arm extending from the rear plate in a direction away from a rear surface of the display module;

a bending link having one end coupled to the rotary arm through a rotary shaft; and a first driver configured to provide power in a first direction to the bending link, whereby, when the first driver provides power in the first direction, the rotary arm rotates and the display module transitions to the second state.

11. The bendable display device according to claim 10, wherein the slide module includes the sliding frame coupled to the rotary shaft and including an arch-shaped shaft slot formed therein, a center of curvature of the bendable portion in the second state corresponds to a center of curvature of the shaft slot.

12. The bendable display device according to claim 11, wherein the center of curvature of the shaft slot is located lower than a lower end of the sliding frame.

13. The bendable display device according to claim 11, wherein the rotary shaft is located at a first end of the shaft slot in the first state, and is located at a second end of the shaft slot in the second state, and wherein the rotary arm rotates at an angle corresponding to an extension angle of the shaft slot when transitioning from the first state to the second state.

14. A bendable display device comprising:

a display module including a first flat portion, a second flat portion, and a bendable portion disposed between the first flat portion and the second flat portion;

a bending module configured to bend and deform the bendable portion so that the first flat portion transitions from a first state in which the first flat portion faces a first direction to a second state in which the first flat portion faces a second direction; and a slide module configured to slide the second flat portion in the first direction so that the first flat portion transitions from the second state to a third state in which the first flat portion further moves in the second direction, wherein the slide module includes a sliding frame with a first display rail, wherein the bending module includes a rear plate provided with a second display rail, the second display rail consecutively arranged in the first direction with respect to the first display rail, and wherein a first display pin protruding from a rear surface of the bendable portion moves from the first display rail to the second display rail when transitioning from the first state to the second state.

15. The bendable display device according to claim 14, further comprising:

a third display rail formed in the slide module; and a second display pin protruding from a rear surface of the second flat portion and inserted into the third display rail to slide.

16. The bendable display device according to claim 15, wherein the slide module includes:

a first slide frame in which the third display rail is formed; and a second side frame in which the second display rail is formed, wherein a gap through which the second display pin passes is formed between the first slide frame and the second slide frame.

17. A bendable display device comprising:

a display module including a first flat portion, a second flat portion, and a bendable portion disposed between the first flat portion and the second flat portion;

a bending module configured to bend and deform the bendable portion so that the first flat portion transitions from a first state in which the first flat portion faces a first direction to a second state in which the first flat portion faces a second direction; and a slide module including a sliding frame, and configured to slide the second flat portion in the first direction so that the first flat portion transitions from the second state to a third state in which the first flat portion further moves in the second direction, wherein the bending module includes:

a rear plate positioned at a rear surface of the first flat portion of the display module;

a rotary arm extending from the rear plate in a direction away from a rear surface of the display module;

a bending link having one end coupled to the rotary arm through a rotary shaft; and a first driver configured to provide power in a first direction to the bending link, and whereby, when the first driver provides power in the first direction, the rotary arm rotates and the display module transitions to the second state.

18. The bendable display device according to claim 17, wherein the slide module includes the sliding frame coupled to the rotary shaft and including an arch-shaped shaft slot formed therein, and wherein a center of curvature of the bendable portion in the second state corresponds to a center of curvature of the shaft slot.

19. The bendable display device according to claim 18, wherein the center of curvature of the shaft slot is located lower than a lower end of the sliding frame.

20. The bendable display device according to claim 18, wherein the rotary shaft is located at a first end of the shaft slot in the first state, and is located at a second end of the shaft slot in the second state, and wherein the rotary arm rotates at an angle corresponding to an extension angle of the shaft slot when transitioning from the first state to the second state.

* * * * *